(12) United States Patent
Iqbal et al.

(10) Patent No.: US 10,430,779 B2
(45) Date of Patent: Oct. 1, 2019

(54) SYSTEMS AND METHODS FOR TRANSACTING AT AN ATM USING A MOBILE DEVICE

(71) Applicant: Capital One Financial Corporation, McLean, VA (US)

(72) Inventors: Mohammed Zafar Iqbal, McLean, VA (US); Kevin Rosengren, Richmond, VA (US); Max Doerfler, Richmond, VA (US); Brian DeLuca, Midlothian, VA (US); Anurag Joshi, Glen Allen, VA (US); James Dillon, Midlothian, VA (US); Richie Hollins, Mechanicsville, VA (US); Jamie Warder, Bethesda, MD (US); William A. Hodges, Mechanicsville, VA (US); Ken Allen, Glen Allen, VA (US)

(73) Assignee: Capital One Services LLC, McLean, VA (US)

( * ) Notice: Subject to any disclaimer, the term of this patent is extended or adjusted under 35 U.S.C. 154(b) by 363 days.

(21) Appl. No.: 14/680,857

(22) Filed: Apr. 7, 2015

(65) Prior Publication Data
US 2015/0287018 A1    Oct. 8, 2015

Related U.S. Application Data

(60) Provisional application No. 62/102,857, filed on Jan. 13, 2015, provisional application No. 61/976,703, filed on Apr. 8, 2014.

(51) Int. Cl.
*G06Q 20/32* (2012.01)
*G06Q 20/40* (2012.01)
*G06Q 20/18* (2012.01)

(52) U.S. Cl.
CPC ......... *G06Q 20/3223* (2013.01); *G06Q 20/18* (2013.01); *G06Q 20/3221* (2013.01); *G06Q 20/3224* (2013.01); *G06Q 20/40145* (2013.01)

(58) Field of Classification Search
CPC ......... G06Q 20/3223; G06Q 20/40145; G06Q 20/18; G06Q 20/3221; G06Q 20/3224
See application file for complete search history.

(56) References Cited

U.S. PATENT DOCUMENTS

| 6,105,009 | A | * | 8/2000 | Cuervo | G06Q 20/00 235/375 |
| 8,364,593 | B2 | * | 1/2013 | Trifiletti | G06Q 20/20 705/44 |

(Continued)

OTHER PUBLICATIONS

Rob Weber, "Integrating Biometrics Technlology in E-Commerce Environments," Fourth Quarter 2000, Computer Technology Review, pp. 4-8. (Year: 2000).*

(Continued)

*Primary Examiner* — Kenneth Bartley
(74) *Attorney, Agent, or Firm* — Finnegan, Henderson, Farabow, Garett & Dunner, LLP.

(57) ABSTRACT

The disclosed embodiments provide systems and methods for transacting at a local financial service provider device using a mobile device. The system may include one or more processors configured to execute instructions to receive transaction data associated with a transaction request including a customer identifier received from a mobile device associated with the customer. Additionally, the processors may receive authentication data associated with the customer that may be provided by the customer operating the mobile device and without requiring the customer to input data directly at the local financial service provider device. The processors may further determine whether the received authentication data authenticates the transaction, authorize (Continued)

the transaction, and provide an indication to the local financial service provider device to perform the transaction based on a determination that the customer operating the mobile device is physically located within a threshold distance away from the local financial service provider device.

20 Claims, 17 Drawing Sheets

(56) References Cited

U.S. PATENT DOCUMENTS

| | | | | |
|---|---|---|---|---|
| 8,713,091 | B2* | 4/2014 | Phillips | G06F 8/48 709/203 |
| 8,972,297 | B2* | 3/2015 | Kay | G06Q 40/02 705/1.1 |
| 8,996,879 | B2* | 3/2015 | Poornachandran | H04L 63/0853 713/185 |
| 9,189,220 | B2* | 11/2015 | Gill | G06F 8/61 |
| 9,519,934 | B2* | 12/2016 | Calman | G06Q 40/02 |
| 9,633,352 | B2* | 4/2017 | Henderson | G06Q 20/4012 |
| 9,646,342 | B2* | 5/2017 | Calman | G06Q 40/02 |
| 9,799,031 | B2* | 10/2017 | Trifiletti | G06Q 20/20 |
| 10,032,008 | B2* | 7/2018 | Griffiths | G06F 21/305 |
| 2001/0056402 | A1* | 12/2001 | Ahuja | G06Q 20/1085 705/43 |
| 2002/0035541 | A1* | 3/2002 | Makino | G06Q 20/108 705/43 |
| 2003/0220765 | A1* | 11/2003 | Overy | H04L 63/0492 702/158 |
| 2006/0179127 | A1* | 8/2006 | Randall | H04M 19/04 709/219 |
| 2006/0206709 | A1* | 9/2006 | Labrou | G06Q 20/18 713/167 |
| 2006/0217111 | A1* | 9/2006 | Marolia | G06F 8/65 455/418 |
| 2007/0007331 | A1* | 1/2007 | Jasper | G06Q 20/20 235/379 |
| 2007/0027803 | A1* | 2/2007 | Brandes | G06Q 20/04 705/39 |
| 2007/0295805 | A1* | 12/2007 | Ramachandran | G06Q 20/108 235/379 |
| 2008/0040271 | A1* | 2/2008 | Hammad | G06Q 20/085 705/41 |
| 2009/0063267 | A1* | 3/2009 | Dubinko | G06Q 30/00 705/14.14 |
| 2009/0152343 | A1* | 6/2009 | Carter | G06Q 10/0633 235/379 |
| 2009/0328052 | A1* | 12/2009 | Nguyen | G06Q 20/32 718/104 |
| 2010/0332388 | A1 | 12/2010 | Rielly et al. | |
| 2011/0047075 | A1* | 2/2011 | Fourez | G06Q 20/32 705/44 |
| 2011/0143711 | A1* | 6/2011 | Hirson | G06Q 20/32 455/410 |
| 2011/0238573 | A1* | 9/2011 | Varadarajan | G06Q 20/1085 705/43 |
| 2012/0167188 | A1* | 6/2012 | Poornachandran | H04L 63/0853 726/7 |
| 2012/0197798 | A1 | 8/2012 | Grigg et al. | |
| 2013/0046692 | A1 | 2/2013 | Grigg et al. | |
| 2013/0073467 | A1 | 3/2013 | Underwood | |
| 2013/0103486 | A1* | 4/2013 | Hess | G06Q 30/02 705/14.38 |
| 2013/0110624 | A1* | 5/2013 | Mitrovic | G06Q 30/0261 705/14.53 |
| 2013/0117695 | A1* | 5/2013 | Hammoud | G06Q 30/00 715/761 |
| 2013/0212018 | A1* | 8/2013 | Trifiletti | G06Q 20/20 705/44 |
| 2013/0226717 | A1* | 8/2013 | Ahluwalia | G06Q 20/20 705/16 |
| 2013/0238497 | A1* | 9/2013 | Ramachandran | G06Q 20/36 705/41 |
| 2014/0089112 | A1 | 3/2014 | Argue et al. | |
| 2014/0164249 | A1* | 6/2014 | Guerrino | G06Q 20/3821 705/64 |
| 2014/0263618 | A1* | 9/2014 | McCarthy | G06Q 40/02 235/379 |
| 2014/0279101 | A1* | 9/2014 | Duplan | G06Q 20/3224 705/18 |
| 2014/0349615 | A1* | 11/2014 | Hsu | H04L 63/20 455/411 |
| 2015/0242601 | A1* | 8/2015 | Griffiths | G06F 21/305 726/5 |
| 2015/0242605 | A1* | 8/2015 | Du | G06F 21/32 726/7 |
| 2015/0356561 | A1* | 12/2015 | Chang | H04L 12/2805 705/72 |

OTHER PUBLICATIONS

International Search Report and the Written Opinion dated Jul. 10, 2015, in counterpart International Application No. PCT/US15/24726, 14 pages.

Extended European Search Report for EP15776422, dated Oct. 11, 2017 (9 pages).

* cited by examiner

SYSTEMS AND METHODS FOR TRANSACTING AT AN ATM USING A MOBILE DEVICE

PRIORITY CLAIM

This disclosure claims priority under 35 U.S.C. § 119 to U.S. provisional patent application Nos. 61/976,703 filed on Apr. 8, 2014, and 62/102,857 filed on Jan. 13, 2015, each entitled "Systems and Methods for Detecting and Identifying Customers Using a Mobile Device." The aforementioned applications are incorporated herein by reference in their entirety.

TECHNICAL FIELD

The disclosed embodiments generally relate to systems and methods for detecting and identifying customers, and more specifically, for detecting and identifying customers operating a mobile device, and conducting a financial transaction with a financial service provider.

BACKGROUND

Consumers often use mobile channels and applications when performing financial transactions. Typical mobile applications on a device, such as a smart phone or tablet, limit the number, type, or value of transactions. Additionally, traditional automated teller machine (ATM) technology as well as financial policies and procedures may also limit the number, type, or value of transactions initiated through the use of mobile applications on a device such as a smart phone or tablet. Although mobile applications exist, certain transactions still require human intervention or human interface with a machine, such as an ATM. For example, typical cash withdrawal systems require human interface with the ATM or teller. Requiring that certain transactions be conducted in person with a representative of a financial account provider at the physical location of the transaction creates an inconvenience for the customer, who would prefer to initiate and authorize these transactions remotely and without having to take time to provide additional information on a machine or to a teller or to carry additional cards or account information.

Current mechanisms for identifying a customer vary by channel (mobile, online, in person), requiring the customer to remember his or her credentials for each distinct channel. For example, a customer may be required to remember a username and password, social security number, account number, and ATM Pin number, depending on the channel they use to conduct financial transactions. Additionally, customers may be required to carry with them debit or ATM cards.

Further, some typical identification systems are unappealing to customers who would like to conduct private transactions in a private location. For example, allowing a customer to initiate an ATM withdrawal using a smartphone, tablet or computer from a private location (such as their own home, office, car, etc.), rather than requiring him or her to enter their information at a public ATM, may allow the customer to feel more secure with their financial information. Further, allowing a customer to conduct a transaction without swiping a debit or ATM card allows the customer to avoid the risk of exposing his or her financial information to ATM skimmers or other fraudulent devices. Further, giving the customer the option of using the smaller screen of a smart phone or tablet allows the customer to feel secure that the smaller form factor of the smartphone or tablet allows them to keep their personal information (account number, pin, balances, types of accounts) private from other people "looking over their shoulder" when it is displayed on the ATM screen.

The above elements may allow customers to feel safer, as they are required to spend less time at an ATM while conducting financial transactions. For example, because customers are required to conduct less physical interaction at the ATM (e.g., no card swipe, no pin entry, no selection of account and amount, etc.), the time the customer is at the ATM is greatly reduced. This may give the customer a greater sense of physical security. It may also reduce the customer's chance of being robbed after getting cash, which for some customers is a severe and legitimate concern.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Certain disclosed embodiments provide systems and methods for enabling a customer to send cash from his or her account to another customer or even to someone who is not a customer. For example, certain embodiments may allow a customer to enter the phone number or email of a recipient, and initiate a message to the owner of the phone or email account informing them that they have cash and that they can go to an ATM to withdraw that cash. When arriving at the ATM, and once identified by the ATM, the recipient may receive another message with a one-time pin that will be deactivated in a specified time frame. The recipient can use that one time pin to retrieve the cash from the ATM. Additionally or alternatively, BLE beacons, NFC, or a unique high pitch frequency that the microphone on the smartphone would detect, or some other type of sensor that can associate the ATM device with the mobile device, may be used in lieu of a one-time pin to authenticate the mobile device at the ATM. Certain aspects of the disclosed embodiments may attract new customers and encourage current customers to use the financial service provider's accounts and services more often.

Certain disclosed embodiments provide improved systems and methods for detecting and identifying a customer with a mobile device conducting a financial transaction. For example, certain disclosed embodiments may enable customers to conduct a broader range of financial transactions through mobile channels, such as a mobile application on a mobile device, without having to physically enter information on a machine or provide the information to an individual such as a teller. Certain disclosed embodiments may provide services that are valuable to both consumers and financial service providers. For example, aspects of the disclosed embodiments may provide a user with a process for conducting financial transactions from a mobile channel without the need to physically enter the financial information to a machine or teller, which may save time and effort for the user and limit the exposure of customer data and personal information. Moreover, certain aspects of the disclosed embodiments may attract new customers and encourage current customers to use the financial service provider's accounts and services more often.

Other aspects of the disclosed embodiments are set forth below in this disclosure. For example, the disclosed embodiments may provide systems and methods for transacting at a local financial service provider device. Consistent with disclosed embodiments, the system may include one or more memory devices storing instructions, and one or more processors configured to execute the instructions to receive transaction data associated with a transaction request received from a mobile device associated with a customer. The transaction data may include a customer identifier. Additionally, the one or more processors may further be configured to receive authentication data associated with the customer. The authentication data may be provided by the customer operating the mobile device and without requiring the customer to directly input data at the local financial service provider device. The one or more processors may further be configured to determine whether the received authentication data authenticates the transaction. The one or more processors may be configured to authorize the transaction when the authentication data authenticates the transaction and provide an indication to the local financial service provider device to perform the transaction based on a determination that the customer operating the mobile device is physically located within a threshold distance away from the local financial service provider device.

The disclosed embodiments also include a computer-implemented method for transacting at a local financial service provider device. The method may include, for example, receiving, by one or more processors, transaction data associated with a transaction request received from a mobile device associated with a customer. The transaction data may include a customer identifier. Additionally, the method may further include receiving, by the one or more processors, authentication data associated with the customer. The authentication data may be provided by the customer operating the mobile device and without requiring the customer to directly input data at the local financial service provider device. The method may further include determining whether the received authentication data authenticates the transaction, and authorizing the transaction when the authentication data authenticates the transaction. The method may also include providing an indication to the local financial service provider device to perform the transaction based on a determination that the customer operating the mobile device is physically located within a threshold distance away from the local financial service provider device.

In accordance with additional embodiments of the present disclosure, a computer-readable medium is disclosed that stores instructions that, when executed by a processor(s), causes the processor(s) to perform operations consistent with one or more disclosed methods.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
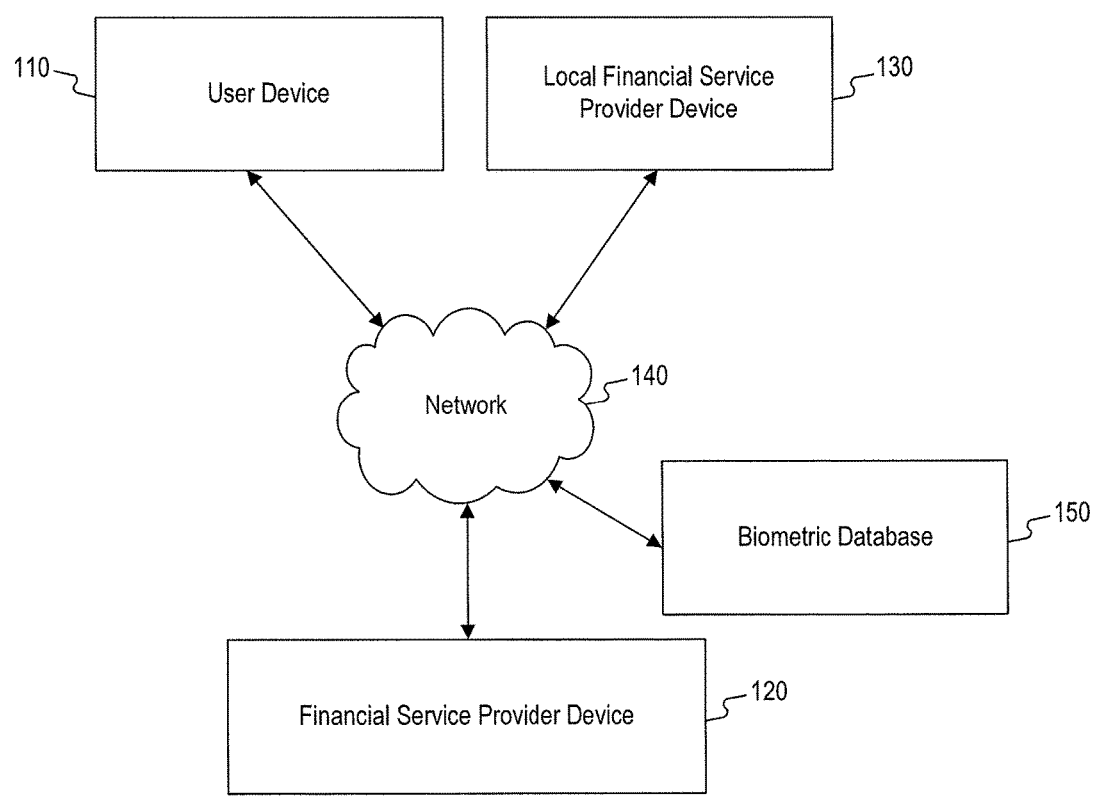
FIG. 1 is a block diagram of an exemplary system, consistent with disclosed embodiments.

FIG. 1 shows a diagram of an exemplary system 100, consistent with disclosed embodiments. As shown in FIG. 1, system 100 may include a user device 110, a financial service provider device 120, a local financial service provider device 130, and a network 140 to facilitate communication among the components of system 100. The components and arrangement of the components included in system 100 may vary. Thus, system 100 may further include other components that perform or assist in the performance of one or more processes consistent with the disclosed embodiments. The components and arrangements shown in FIG. 1 are not intended to limit the disclosed embodiments, as the components used to implement the disclosed processes and features may vary.

In accordance with disclosed embodiments, a detection and identification system 100 may include a financial service provider (FSP) device 120. FSP device 120 may be a system associated with a financial service provider (not shown), such as a bank, a credit card company, a lender, brokerage firm, or any other type of financial service entity that generates, provides, manages, and maintains financial service accounts, etc. for one or more users. FSP device 120 may be one or more computing systems that are configured to execute software instructions stored on one or more memory devices to perform one or more operations consistent with the disclosed embodiments. For example, FSP device 120 may include one or more memory device(s) storing data and software instructions, and one or more processor(s) configured to use the data and execute the software instructions to perform server-based functions and operations known to those skilled in the art. FSP device 120 may include one or more general purpose computers, mainframe computers, or any combination of these types of components.

In certain embodiments, FSP device 120 may be configured as a particular apparatus, system, and the like based on the storage, execution, and/or implementation of the software instructions that cause a processor to perform one or more operations consistent with the disclosed embodiments. FSP device 120 may be standalone, or it may be part of a subsystem, which may be part of a larger system. For example, FSP device 120 may represent distributed servers that are remotely located and communicate over a public network (e.g., network 140) or a dedicated network, such as a LAN, for a financial service provider. An exemplary computing system consistent with FSP device 120 is discussed in additional detail with respect to FIG. 2, below.

FSP device 120 may include or may access one or more storage devices configured to store data and/or software instructions used by one or more processors of FSP device 120 to perform operations consistent with disclosed embodiments. For example, FSP device 120 may include memory 230 configured to store one or more software programs that performs several functions when executed by a processor. The disclosed embodiments are not limited to separate programs or computers configured to perform dedicated tasks. For example, FSP device 120 may include memory that stores a single program or multiple programs. Additionally, FSP device 120 may execute one or more programs located remotely from FSP device 120. For example, FSP device 120 may access one or more remote programs stored in memory included with a remote component that, when executed, perform operations consistent with the disclosed embodiments. In certain aspects, FSP device 120 may include server software that generates, maintains, and provides services associated with financial account management. In other aspects, FSP device 120 may connect separate server(s) or similar computing devices that generate, maintain, and provide services associated with financial data for a financial service provider associated with FSP device 120.

System 100 may also include one or more local FSP devices 130. Local FSP devices may include, for example, ATMs or detection devices in local FSP branches. Local FSP device 130 may include one or more memory device(s) that store data that may be used for performing one or more processes consistent with the disclosed embodiments. For example, local FSP device 130 may include one or more memory device(s) storing data and software instructions, and one or more processor(s) configured to use the data and execute the software instructions to perform computing functions and operations known to those skilled in the art. In certain aspects, local FSP device 130 may additionally, or alternatively, include one or more servers or other types of computer devices, which may be configured to execute software instructions stored in memory to perform one or more processes consistent with the disclosed embodiments.

Local FSP device 130 may further include server(s) that are configured to execute stored software instructions to perform operations associated with collecting, storing, and accessing biometric data, including one or more processes associated with gathering biometric data from a variety of sources, compiling the data, and organizing the data into easily accessible profiles. Local FSP device 130 may include one or more servers that may be a general purpose computer, a mainframe computer, or any combination of these components. In certain embodiments, local FSP device 130 (or a system including local FSP device 130) may be configured as a particular apparatus, system, and the like based on the storage, execution, and/or implementation of the software instructions that cause a processor to perform one or more operations consistent with the disclosed embodiments. A local FSP device 130 may be standalone, or it may be part of a subsystem, which may be part of a larger system. For example, local FSP device 130 may represent distributed servers that are remotely located and communicate over a public network (e.g., network 140) or a dedicated network, such as a LAN. An exemplary computer system consistent with local FSP device 130 is discussed in additional detail with respect to FIG. 2. In certain embodiments, a third party may operate the components associated with local FSP device 130. Additionally or alternatively, local FSP device 130 may be a part or subpart of FSP device 120.

System 100 may further include one or more user devices 110. A user may operate a user device 110, which may be a desktop computer, laptop, tablet, smartphone, multifunctional watch, pair of multifunctional glasses, tracking device, or any suitable device with computing capability. User device 110 may include one or more processor(s) and memory device(s) known to those skilled in the art. For example, user device 110 may include memory device(s) that store data and software instructions that, when executed by one or more processor(s), perform operations consistent with the disclosed embodiments. In one aspect, user device 110 may have a financial application installed thereon, which may enable user device 110 to communicate with FSP device 120 via network 140. For instance, user device 110 may be a smartphone or tablet or the like that executes a stored mobile application that performs online banking operations. In other embodiments, user device 110 may connect to FSP device 120 through use of browser software stored and executed by user device 110. User device 110 may be configured to execute software instructions to allow a user to access information stored in FSP 120, such as, for example, financial information related to recent purchase transactions, financial discounts, financial statements, account information, rewards program information and the like. Additionally, user device 110 may be configured to execute software instructions that initiate and conduct transactions with FSP device 120, such as, for example, ATM withdrawals, wire transfers, debit card PIN resets, and call center transactions. An exemplary computer system consistent with user device 110 is discussed in additional detail with respect to FIG. 2.

A user may operate user device 110 to perform one or more operations consistent with the disclosed embodiments. In one aspect, a user may be a customer of a financial service provider. For instance, a financial service provider may maintain a financial service account (e.g., checking account, savings account, debit card account, or credit card account) for the user that the user may use to purchase goods and/or services. Additionally or alternatively, the user may use user device 110 and the financial service account (for example, through a mobile application installed on user device 110) to withdraw cash from an ATM, contact a customer call center, transfer or wire money, or reset their debit account PIN.

A user may further operate user device 110 in order to be detected and recognized by local FSP device 130. For example, user device 110 may detect, through the use of network 140, a local FSP device 130 in its immediate proximity. Additionally or alternatively, local FSP device 130 may detect user device 110 in its immediate proximity. User device 110 may then connect to local FSP device 130 in order to initiate, conduct, or complete a financial transaction without the need for the user to interface directly with FSP device 130.

System 100 may also include one or more biometric databases 150. Biometric database 150 may include one or more memory device(s) that store data that may be used for performing one or more processes consistent with the disclosed embodiment. In certain aspects, biometric database 150 may additionally, or alternatively, include one or more servers or other types of computer devices. The biometric database 150 may include one or more server(s), which may be one or more computing devices configured to execute software instructions stored in memory to perform one or more processes consistent with the disclosed embodiments. For example, biometric database 150 may include one or more memory device(s) storing data and software instructions, and one or more processor(s) configured to use the data and execute the software instructions to perform server-based functions and operations known to those skilled in the art.

Biometric database 150 may further include server(s) that are configured to execute stored software instructions to perform operations associated with collecting, storing, and accessing biometric data, including one or more processes associated with gathering biometric data from a variety of sources, compiling the data, and organizing the data into easily accessible profiles. Biometric database 150 may include one or more servers that may be a general purpose computer, a mainframe computer, or any combination of these components. In certain embodiments, biometric database 150 (or a system including biometric database 150) may be configured as a particular apparatus, system, and the like based on the storage, execution, and/or implementation of the software instructions that perform one or more operations consistent with the disclosed embodiments. A biometric database 150 may be standalone, or it may be part of a subsystem, which may be part of a larger system. For example, biometric database 150 may represent distributed servers that are remotely located and communicate over a public network (e.g., network 140) or a dedicated network, such as a LAN. An exemplary computer system consistent with biometric database 150 is discussed in additional detail with respect to FIG. 2.

In certain embodiments, biometric database 150 may be associated with an entity, such as a company, organization, agency, etc. In some embodiments, the biometric database entity may be a different entity than a financial service provider associated with FSP device 120. In certain aspects, a user or user(s) affiliated with a biometric database entity may operate one or more components associated with biometric database 150 to collect and maintain biometric data. In other embodiments, biometric database 150 may be associated with a financial service provider or other entity associated with FSP device 120. For example, biometric database 150 may be a part or subpart of FSP device 120.

Network 140 may comprise any type of computer networking arrangement used to exchange data. For example, network 140 may be the Internet, a private data network, a virtual private network using a public network, a Wi-Fi network, a LAN or WAN network, and/or other suitable connections that may enable information exchange among various components of the system 100. Network 140 may also include a public switched telephone network ("PSTN") and/or a wireless cellular network. Network 140 may be a secured network or unsecured network. In other embodiments, one or more components of system 100 may communicate directly through a dedicated communication link(s), such as links between user device 110, financial service provider device 120, and local FSP device 130.

Additionally or alternatively, network 140 may include a direct communication network. Direct communications may use any suitable technologies, including, for example, BLUETOOTH™, BLUETOOTH LE™ (BLE), Wi-Fi, near field communications (NFC), or other suitable communication methods that provide a medium for transmitting data between separate devices. In certain embodiments, user device 110 and local FSP device 130 may connect and communicate through a direct communications network.

Other components known to one of ordinary skill in the art may be included in system 100 to process, transmit, provide, and receive information consistent with the disclosed embodiments.

Figure 2:
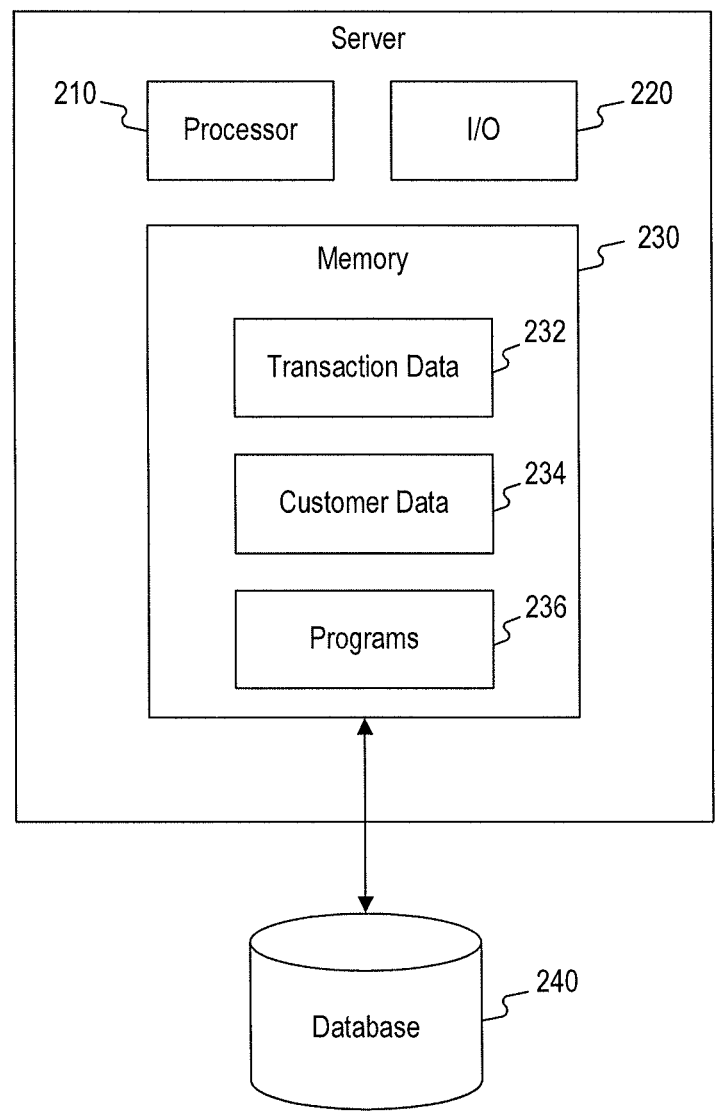
FIG. 2 is a block diagram of an exemplary computer system, consistent with disclosed embodiments.

FIG. 2 shows a diagram of an exemplary computing system 200 illustrating a computing system configuration that may be associated with financial service provider device 120, local FSP device 130, biometric database 150, and/or user device 110, consistent with disclosed embodiments. In some embodiments, computing system 200 may include one or more processors 210, one or more memories 230, and one or more input/output (I/O) devices 220. In some embodiments, computing system 200 may take the form of a server, general purpose computer, a mainframe computer, laptop, smartphone, mobile device, or any combination of these components. In certain embodiments, computing system 200 (or a system including computing system 200) may be configured as a particular apparatus, system, and the like based on the storage, execution, and/or implementation of the software instructions that cause a processor to perform one or more operations consistent with the disclosed embodiments. Computing system 200 may be standalone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions used by processor 210 to perform functions related to the disclosed embodiments. For example, memory 230 may be configured with one or more software instructions, such as program(s) 236 that may perform one or more operations when executed by processor 210. The disclosed embodiments are not limited to separate programs or computers configured to perform dedicated tasks. For example, memory 230 may include a program 236 that performs the functions of computing system 200, or program 236 could comprise multiple programs. Additionally, processor 210 may execute one or more programs located remotely from computing system 200. For example, financial service provider device 120, biometric database 150, or user device 110, may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely.

Programs executed by processor 210 may cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, processing orders for certified funds, processing orders for new or reissue debit cards, and processing ATM cash withdrawals.

Memory 230 may also store data that may reflect any type of information in any format that the system may use to perform operations consistent with the disclosed embodiments. Memory 230 may store instructions to enable processor 210 to execute one or more applications, such as server applications, an authentication application, network communication processes, and any other type of application or software. Alternatively, the instructions, application programs, etc., may be stored in an external storage (not shown) in communication with computing system 200 via network 140 or any other suitable network. Memory 230 may be a volatile or non-volatile, magnetic, semiconductor, tape, optical, removable, non-removable, or other type of storage device or tangible (i.e., non-transitory) computer-readable medium.

Memory 230 may include transaction data 232. Transaction data 232 may include information related to financial transactions initiated by a user. For example, transaction data may include a user identifier and a transaction type. The user identifier may be a credit or debit card number, an account number, or another means for identifying the user initiating the financial transaction. The transaction type may include an indicator of the type of transaction the user is initiating, such as, ATM cash withdrawal, debit PIN reset, money wire or transfer, call to the customer service center, ordering a new or reissue debit card, ordering certified funds, or other transactions requiring user authentication. Transaction data 232 may also include authentication data obtained from the user for the purposes of authorizing the transaction, for example, by verifying the authenticity of provided biometric data as compared to stored biometric data. Additionally or alternatively, transaction data 232 may be stored in database 240 or in an external storage (not shown) in communication with computing system 200 via network 140 or any other suitable network.

Memory 230 may further include customer data 234. Customer data 234 may include information about particular customers of the financial service provider. For example, client data 234 may include clients' account information, debit or credit card information, history of purchase transactions, financial statements, credit score, risk profile, username and password, debit card PIN, home and work locations, and/or biometric information. Additionally, customer data 234 may include user device identification information, such as, for example, a phone number, email address, IP address, BLUETOOTH™ signature, or other device identifier. Alternatively customer data 234 may be stored in database 240 or in an external storage (not shown) in communication with computing system 200 via network 140 or any other suitable network.

Processor 210 may analyze transaction data 232 in reference to customer data 234. For example, processor 210 may analyze transaction data to determine which client with information stored in client information 234 is initiating the financial transaction. Processor 210 may access the particular user's customer information to determine their account information, debit or credit card information, history of purchase transactions, financial statements, credit score, risk profile, username and password, debit card PIN, home and work locations, and/or authentication data.

I/O devices 220 may be one or more device that is configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, computing system 200 may include interface components, which may provide interfaces to one or more input devices, such as one or more keyboards, mouse devices, and the like, which may enable computing system 200 to receive input from an operator of FSP device 120 (not shown).

Computing system 200 may also contain one or more database(s) 240. Alternatively, computing system 200 may be communicatively connected to one or more database(s) 240. Computing system 200 may be communicatively connected to database(s) 240 through network 140. Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request and the data contained in the request, etc. Systems and methods of disclosed embodiments, however, are not limited to separate databases. Database 240 may include computing components (e.g., database management system, database server, etc.) configured to receive and process requests for data stored in memory devices of database(s) 240 and to provide data from database 240.

As discussed above, FSP device 120 may include at least one computing system 200. Further, although sometimes discussed here in relation to FSP device 120, it should be understood that variations of computing system 200 may be used by other components of system 100, including local FSP device 130 and user device 110. Computing system 200 may be a single server or may be configured as a distributed computer system including multiple servers or computers that interoperate to perform one or more of the processes and functionalities associated with the disclosed embodiments.

In some aspects, local FSP device 130 and/or user device 110 may include the same or similar configuration and/or components of computing system 200. For example, computing system 200, when implemented in local FSP device 130, may include hardware and/or software installed therein for performing one or more processes disclosed herein.

Figure 3:
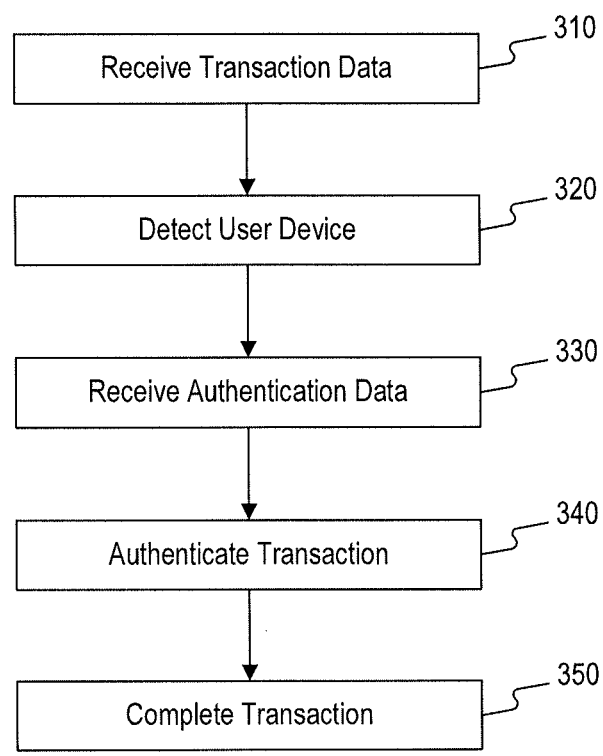
FIG. 3 is a flowchart of an exemplary process for detecting and identifying a customer with a user device conducting a financial transaction, consistent with disclosed embodiments.

FIG. 3 shows an exemplary detection and identification process, consistent with disclosed embodiments. Process 300 may be performed by processor 210 of, for example, FSP device 120 and/or local FSP device 130 executing instructions encoded on a computer-readable medium storage device. It is to be understood, however, that one or more steps of process 300 may be implemented by other components of system 100 (shown or not shown), including user device 110.

At step 310, FSP device 120 may receive transaction data. In one aspect, FSP device 120 may receive transaction data from user device 110. As an example, user device 110 may execute a mobile application associated with the financial service provider associated with FSP device 120. The user device 110 may transmit transaction data via network 140 to FSP device 120. Transaction data may be entered manually into user device 110 by a user, for example by typing it on a keyboard or other input device (not shown), using voice recognition software, etc. Transaction data may also be entered and transmitted automatically, for example, by a mobile application on user device 110. Alternatively, local FSP device 130 may receive the transaction data from user device 110. For example, a user operating user device 110 may enter information requesting a monetary withdrawal of funds from a financial service account provided by a financial service provider (e.g., an entity associated with FSP device 120), or additionally or alternatively may enter information requesting an alternative financial transaction, such as ordering certified funds, depositing money, and/or transferring funds. User device 110 may be configured to generate an interface to request transaction data from the user regarding the withdrawal. User device 110 may receive the user input of transaction data and store the received transaction data for processing in accordance with one or more operations consistent with the disclosed embodiments.

Transaction data may include a type of transaction and a customer identifier. A type of transaction may include, for example, an ATM withdrawal, a money transfer or wire, a debit card PIN reset, a deposit, a check cashing, ordering certified funds, ordering a new or reissued debit card, etc. If the type of transaction is, for example, an ATM withdrawal, money transfer or wire, deposit, ordering of certified funds or cashier's checks, a change order, or check cashing, transaction data may further include an amount. In certain embodiments, transaction data may include other data relating to transactions that is known to those skilled in the art, such as transaction amount, timestamp information, entity identifier, account identifier(s), etc.

In certain aspects, FSP device 120 and/or local FSP device 130 may be configured to execute software that performs processes to determine whether a user (e.g., a customer) operating a mobile device is within a predetermined distance or range of distance(s) of local FSP device 130 (e.g., step 320). For example, in certain aspects, local FSP device 130 may determine whether a user (e.g., a customer) operating a mobile device is within one foot, two feet, six inches, etc. of local FSP device 130. For instance, local FSP device 130 may detect the customer by detecting, through network 140 (Wi-Fi, BLE, NFC, etc.), user device 110. User device 110 may need to be detected at a certain threshold distance before local FSP device 130 will connect and communicate with user device 110. For example, user device 110 may need to be within 6 inches of local FSP device 130 before the devices connect to conduct the transaction. Exemplary and non-limiting operations associated with detecting whether a user (or user device 110) is within a predetermined proximity of local FSP device 130 is described below in connection with FIG. 5.

FSP device 120 and/or local FSP device 130 may detect user device 110 within the necessary threshold proximity. In certain embodiments, local FSP device 130 may receive authentication data from user device 110 (step 330). For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, FSP device 120 may receive authentication data through user device 110. If, for example, local FSP device 130 receives the authentication data, the data may then be transmitted to FSP device 120 for authentication. Authentication data may include, for example, a user name and password, social security number, ATM pin, biometric data, or other data associated with user identification methods (e.g., SureSwipe$^{SM}$ or the like). Biometric data may include, for example, a fingerprint scan, voice recognition, facial recognition, retina or iris scan, heartbeat or pulse pattern, or palm vein scan.

At step 340, FSP device 120 may authenticate and authorize the transaction. In some embodiments, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal to local FSP device 130, via network 140, that the transaction has been authenticated and authorized. Alternatively, local FSP device 130 may authenticate and authorize the transaction independent from FSP device 120. The amount and type of authentication data required for FSP device 120 to authenticate the transaction may be determined by the amount of the transaction. For example, a higher transaction amount may require additional or more secure authentication data. Additional embodiments relating to authenticating and authorizing transactions are disclosed below.

At step 350, local FSP device 130 may complete the transaction. Local FSP device 130 may, for example, dispense cash from an ATM, indicate that a deposit has been successfully processed, notify a teller that the user has been authorized for a cash withdrawal, provide certified funds or cashier's checks, notify the customer that the new or replacement debit card has been ordered, complete the user's initiated transaction, and/or other operations. In certain aspects, FSP device 120 may be configured to generate and provide a message to user device 110 (or some other device) reflecting the results of the authentication operation (e.g., authentication denied and/or transaction denied; authentication accepted and/or transaction authorized).

As a non-limiting example of such embodiments, a user operating user device 110 may provide transaction data via user device 110. In some aspects, user device 110 may execute software that requests and receives transaction data (e.g., account withdrawal request including account number, amount, etc.) and provides the transaction data to local FSP device 130 when communication between devices 110 and 130 has been established based on the proximity threshold determination processes disclosed herein.

Local FSP device 130 may be configured to authenticate the transaction. In some embodiments, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal to local FSP device 130 that the transaction has been authenticated and authorized via network 140. Alternatively, local FSP device 130 may authenticate and authorize the transaction independent from FSP device 120. The amount and type of authentication data required for FSP device 120 to authenticate the transaction may be determined by the amount of the transaction. For example, a higher transaction amount may require additional or more secure authentication data.

Local FSP device 130 may complete an authenticated transaction by, for example, automatically dispensing cash in the amount of the withdrawal request, without the user ever having to physically manipulate components of local FSP device 130 (e.g., use a keypad on local FSP device 130, swipe a card, etc.).

Figure 4:
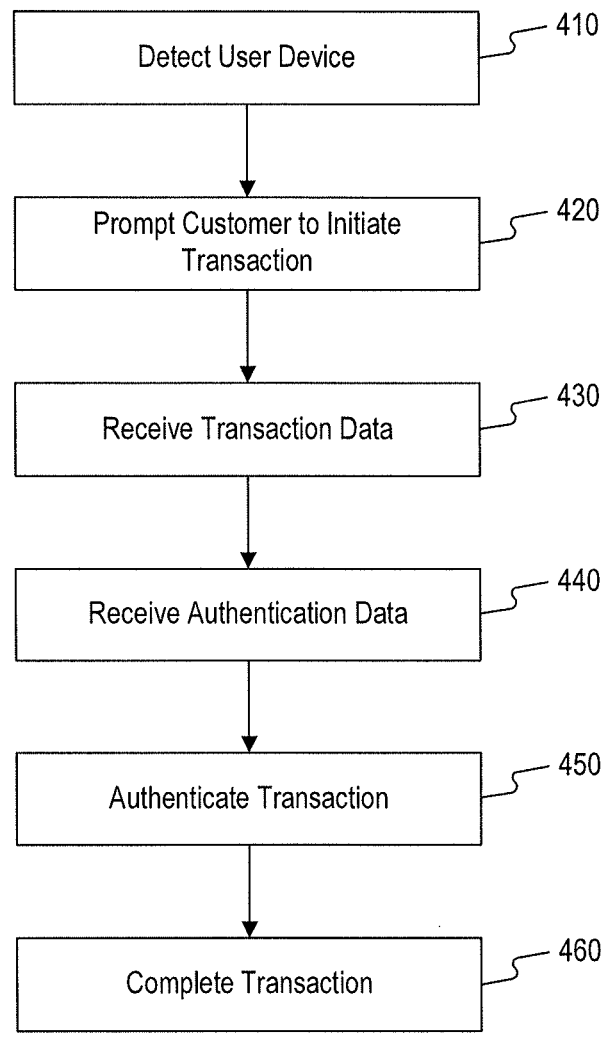
FIG. 4 is a flowchart of an exemplary process for an alternative embodiment for detecting and identifying a customer with a user device conducting a financial transaction, consistent with disclosed embodiments.

FIG. 4 shows an alternative exemplary detection and identification process 400, consistent with disclosed embodiments. Process 400 may be performed by processor 210 of, for example, FSP device 120 and/or local FSP device 130 executing instructions encoded on a tangible computer-readable medium storage device, such as a memory device. It is to be understood, however, that one or more steps of process 400 may be implemented by other components of system 100 (shown or now shown), including user device 110.

At step 410, as also discussed with reference to FIG. 3, FSP device 120 and/or local FSP device 130 may detect a user carrying a user device 110. In certain aspects, local FSP device 130 may be configured to execute software that performs processes to determine whether a user (e.g., customer) with a user device 110 is within a predetermined distance or range of distance(s) of local FSP device 130. For example, in certain aspects, local FSP device 130 may determine whether a user (e.g., customer) with a user device 110 is within one foot, two feet, six inches, etc. of local FSP device 130. For instance, local FSP device 130 may detect the customer by detecting, through network 140 (Wi-Fi, BLE, NFC, etc.), user device 110. User device 110 may need to be detected at a certain threshold distance before local FSP device 130 will connect and communicate with user device 110. For example, user device 110 may need to be within 6 inches of local FSP device 130 before the devices connect to conduct the transaction. Exemplary and non-limiting operations associated with detecting whether a user (or user device 110) is within a predetermined proximity of local FSP device 130 is described below in connection with FIG. 5.

Alternatively, FSP device 120 may detect a customer with user device 110. For example, FSP device 120 may be configured to execute software that performs processes to determine whether a user (e.g., customer) with a user device 110 is within a predetermined distance or range of distance(s) of local FSP device 130. For example, FSP device 120 may be configured to receive a signal from local FSP device 130 indicating that it has detected a signal from user device 110. FSP device 120 may then determine the physical location of user device 110 with respect to local FSP device 130.

At step 420, user device 110 may prompt the user to initiate a financial transaction. For example, user device 110 may be configured to execute software that generates a prompt to (or causes a prompt to be generated to) the user to initiate a financial transaction. For example, FSP device 120 may generate and provide information that may be used in an interface that is displayed by user device 110 via a display device. Additionally or alternatively, local FSP device 130 may transmit a signal to user device 110, for example, via BLE or NFC networks, indicating that user device 110 is within a threshold distance from local FSP device 130. In some embodiments, user device 110 may display a prompt to the user. For example, the prompt may be a message displayed on user device 110. For example, the prompt may be an email, text message, message within a mobile application, or pop-up, among other things.

Alternatively, local FSP device 130 may transmit a signal to FSP device 120, which may then transmit a signal to user device 110 indicating that it is within a threshold distance of a local FSP device 130. For example, user device 110 may be configured to detect local FSP device 130. In certain embodiments, user device 110 operating a mobile application may locate and detect local FSP device 130 via signals transmitted over for example, BLE or NFC networks. FSP device 120 may transmit a signal to user device 110 that may cause user device 110 to display a prompt to the user. For example, user device 110 may be configured to execute software that generates a prompt to (or causes a prompt to be generated to) the user to initiate a financial transaction. The prompt may be displayed within a mobile application running on user device 110. The prompt may contain, for example, a selection of possible transactions a user may initiate on user device 110.

At step 430, as also discussed with reference to FIG. 3, FSP device 120 may receive transaction data from user device 110. User device 110 may be operating a mobile application associated with the financial service provider that transmits transaction data via network 140 to FSP device 120. A user may enter and transmit transaction data into user device 110 manually per transaction, for example, by typing it on a keyboard or other input device (not shown). In certain embodiments, user device 110 may enter and transmit transaction data automatically, for example, by a mobile application on user device 110. Alternatively, local FSP device 130 may receive the transaction data from user device 110. For example, a user device 110 may enter information requesting a monetary withdrawal of funds from a financial service account provided by a financial service provider (e.g., an entity associated with FSP device 120), a deposit of funds into a financial service account provided by a financial service provider, or ordering certified funds from a financial service provider associated with a financial service account. User device 110 may be configured to generate an interface to request transaction data from the user regarding the withdrawal, deposit, or order. User device 110 may receive the user input of transaction data, and store the received transaction data for processing in accordance with one or more operations consistent with the disclosed embodiments.

At step 440, FSP device 120 and/or local FSP device 130 may receive authentication data from user device 110. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, FSP device 120 may receive authentication data through user device 110. If, for example, local FSP device 130 receives the authentication data, the data may then be transmitted to FSP device 120 for authentication. Authentication data may include, for example, a user name and password, social security number, ATM pin, biometric data, or other data associated with user identification methods (e.g., SureSwipe$^{SM}$ or the like). Biometric data may include, for example, a fingerprint scan, voice recognition, facial recognition, retina or iris scan, heartbeat or pulse pattern, or palm vein scan.

At step 450, FSP device 120 may authenticate and authorize the transaction. In some embodiments, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal to local FSP device 130 that the transaction has been authenticated and authorized via network 140. Alternatively, local FSP device 130 may authenticate and authorize the transaction independent from FSP device 120. The amount and type of authentication data required for FSP device 120 may be determined by the amount of the transaction. For example, a higher transaction amount (e.g., withdrawal, deposit, ordering of certified funds) may require additional or more secure authentication data.

At step 460, FSP device 120 and/or local FSP device 130 may complete the transaction. For example FSP device 120 may be configured to transmit a signal to local FSP device 130 indicating that the transaction has been authenticated. Local FSP device may complete an authenticated transaction by, for example, automatically dispensing cash in the amount of the withdrawal request, automatically authorizing certified funds, and/or automatically ordering a new or reissued debit card, without the user ever having to physically manipulate components of local FSP device 130 (e.g., use a keypad on local FSP device 130, swipe a card, etc.) or without requiring the user to enter a branch location. For example, in some embodiments, FSP device 120 may generate and provide data to local FSP device 130 that causes local FSP device 130 to dispense cash in the amount of the withdrawal request. Local FSP 130 device may, for example, dispense cash from an ATM, indicate that a deposit has been successfully processed, notify a teller that the user has been authorized for a cash withdrawal, authorize order for certified funds, notify the user that their order for a new or reissue debit card has been processed, or otherwise complete the user's initiated transaction.

Figure 5:
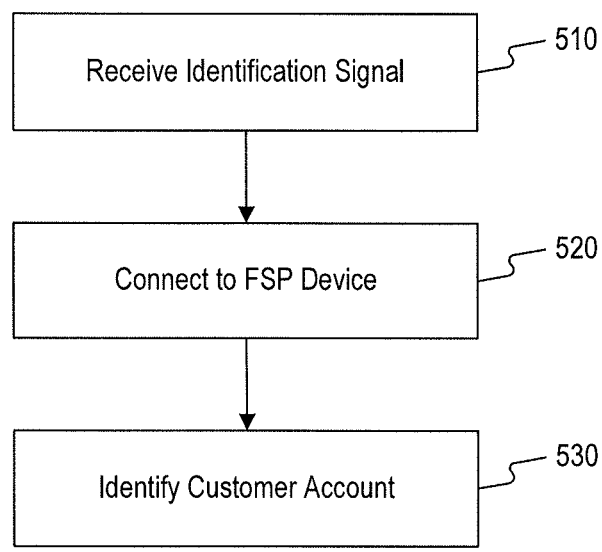
FIG. 5 is a flowchart of an exemplary process for detecting and identifying a customer with a user device, consistent with disclosed embodiments.

FIG. 5 shows an exemplary detection and identification process 500, consistent with disclosed embodiments. Process 500 may be performed by processor 210 of, for example, FSP device 120 executing instructions encoded on a computer-readable medium storage device. It is to be understood, however, that one or more steps of process 500 may be implemented by other components of system 100 (shown or not shown), including local FSP device 130 and/or user device 110.

At step 510, FSP device 120 and/or local FSP device 130 may receive an identification signal transmitted by user device 110 that may, for example, identify a particular user device. For example, user device 110 may be configured to transmit an identification signal. In certain embodiments, user device 110 may be configured to transmit an identification signal when user device 110 is operating a mobile application associated with the financial service provider. For example, user device 110 may be configured to transmit an identification signal via BLE, NFC, Wi-Fi, or other appropriate networks. In some embodiments, local FSP device 130 may be configured to detect an identification signal transmitted by user device 110 via, for example, BLE or NFC. Additionally or alternatively, local FSP device 130 may detect an identification signal transmitted by user device 110 via Wi-Fi or any other suitable network, such as network 140. The identification signal may contain identification information such as device information pertaining to particular user device 110. In certain embodiments, the information signal may contain location information. For example, FSP device 130 may be configured to detect a location of user device 110 based on the information signal. In some embodiments, FSP device 130 may detect the distance between user device 110 and FSP device 130. Additionally or alternatively, the identification signal may contain customer identification data such as an account number, user name, or other personal identifier.

In certain aspects FSP device 120 may receive the identification signal. For example, user device 110 may transmit the identification signal to FSP device 120. Additionally or alternatively, local FSP device 130 may communicate with FSP device 120, for example, via network 140 (step 520). For example, FSP device 130 may transmit the identification information received from user device 110 to FSP device 120. Additionally or alternatively, user device 110 may connect directly to FSP device 120 to transmit identification data.

FSP device 120 may be configured to identify one or more customer accounts based on the identification data (step 530). For example, the identification data may contain a customer identifier. A customer identifier may indicate a customer account stored on, for example, FSP device 120, consistent with the disclosed embodiments, that corresponds to a particular customer. In one aspect, a customer account may relate to the particular user initiating a financial transaction. For example, a customer account may relate to a customer (user) operating user device 110 that provided the identification signal to local FSP device 130. FSP device 120 may be configured to authenticate the transaction. For example, in some embodiments, FSP device 120 may execute software that determines, receives, and processes information associated with the identified customer account to authenticate the transaction initiated by user device 110.

Figure 6:
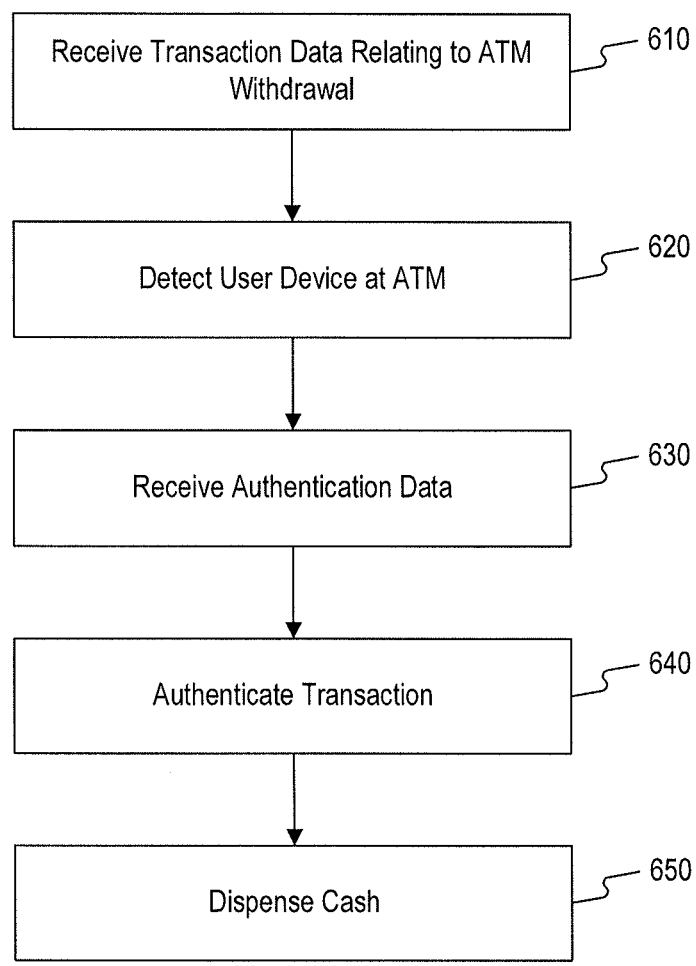
FIG. 6 is a flowchart of an exemplary process for detecting and identifying a customer with a user device conducting an ATM withdrawal, consistent with disclosed embodiments.

FIG. 6 shows an exemplary authentication process for detecting and identifying a customer with a user device conducting an ATM withdrawal, consistent with disclosed embodiments. Process 600 may be performed by processor 210 of, for example, FSP device 120 and/or local FSP device 130 executing instructions encoded on a computer-readable medium storage device. It is to be understood, however, that one or more steps of process 600 may be implemented by other components of system 100 (shown or not shown), including user device 110.

At step 610, FSP device 120 may receive transaction data related to an ATM withdrawal, as previously discussed with reference to FIGS. 3 and 4. As an example, user device 110 may execute a mobile application associated with the financial service provider associated with FSP device 120. The user device 110 may transmit transaction data via network 140 to FSP device 120. Transaction data may be entered manually into user device 110 by a user, for example by typing it on a keyboard or other input device (not shown), using voice recognition software, etc. Transaction data may also be entered and transmitted automatically, for example, by a mobile application on user device 110. Alternatively, local FSP device 130 may receive the transaction data from user device 110. For example, user device 110 may enter information requesting a monetary withdrawal of funds from a financial service account, such as, in this case, an ATM provided by a financial service provider (e.g., an entity associated with FSP device 120). User device 110 may be configured to generate an interface to request transaction data from the user regarding the withdrawal. User device 110 may receive the user input of transaction data and store the received transaction data for processing in accordance with one or more operations consistent with the disclosed embodiments Local FSP device 130 may detect the customer with a user device 110 at an ATM (step 620). In certain aspects, local FSP device 130 may be configured to execute software that performs processes to determine whether a user (e.g., customer) with a user device 110 is within a predetermined distance or range of distance(s) of local FSP device 130. For example, in certain aspects, local FSP device 130 may determine whether a user (e.g., customer) with a user device 110 is within one foot, two feet, six inches, etc. of local FSP device 130. For instance, local FSP device 130 may detect the customer by detecting, through network 140 (Wi-Fi, BLE, NFC, etc.), user device 110. User device 110 may need to be detected at a certain threshold distance before local FSP device 130 will connect and communicate with user device 110. For example, user device 110 may need to be within 6 inches of local FSP device 130 before the devices connect to conduct the transaction. Additionally or alternatively, local FSP device 130 may first detect the customer (step 620) and then receive the transaction data (step 610), as described with reference to FIG. 4. For example, user device 110 may be configured to execute software that generates a prompt to (or causes a prompt to be generated to) the user to initiate a financial transaction. Initiating a financial transaction, for example, may cause user device 110 to transmit transaction data to local FSP device 130.

In certain embodiments, FSP device 120 may determine whether user device 110 is at the local FSP device 130 (e.g., ATM) (step 620). For example, FSP device 120 may be configured to execute software that performs processes to determine whether a user (e.g., customer) with a user device 110 is within a predetermined distance or range of distance(s) of local FSP device 130. In one aspect, FSP device 120 may be configured to execute software that relates the distance of user device 110 to local FSP device 130 to a distance of the customer associated with user device 110. For example, FSP device 120 may be configured to receive a signal from local FSP device 130 indicating that it has detected a signal from user device 110. FSP device 120 may then determine the physical location of user device 110 (and, for instance, the customer) with respect to local FSP device 130.

At step 630, local FSP device 130 and/or FSP device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, FSP device 120 may receive authentication data through user device 110. If, for example, local FSP device 130 receives the authentication data, the data may then be transmitted to FSP device 120 for authentication. Authentication data may include, for example, a user name and password, social security number, ATM pin, biometric data, or other data associated with user identification methods (e.g., Sure-Swipe$^{SM}$ or the like). Biometric data may include, for example, a fingerprint scan, voice recognition, facial recognition, retina or iris scan, or palm vein scan.

At step 640, FSP device 120 and/or local FSP device 130 may authenticate and authorize the transaction, as described in detail with respect to FIGS. 3 and 4. For example, in some embodiments, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal to local FSP device 130 that the transaction has been authenticated and authorized via network 140. Alternatively, local FSP device 130 may authenticate and authorize the transaction independent from FSP device 120. The amount and type of authentication data required for FSP device 120 to authenticate the transaction may be determined by the amount of the transaction. For example, a higher transaction amount may require additional or more secure authentication data.

In certain aspects, FSP device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local FSP device 130, or the ATM. For example, local FSP device 130 may contain a screen or other display. In certain embodiments, messages, such as those reflecting the results of authentication operations, may be displayed to the user via the screen or display of local FSP device 130.

At step 650, local FSP device 130, an ATM, for example, may dispense cash to the user consistent with the amount indicated in the transaction data. Local FSP device 130 may, for example, automatically dispense cash in the amount of the withdrawal request, without the user ever having to physically manipulate components of local FSP device 130 (e.g., use a keypad on local FSP device 130, swipe a card, etc.). In certain embodiments, FSP device 120 may be configured to transmit information to local FSP device 130 indicating that the transaction has been authenticated. Additionally, FSP device 120 may transmit information to local FSP device 130 indicating that local FSP device 130 should dispense cash in the transaction amount.

In certain embodiments, cash dispensing may complete the transaction. Prior to dispensing the cash, local FSP device 130, embodied as an ATM, may display to the user a message indicating that the transaction is processing and that the cash is dispensing. For example, FSP device 120 and/or local FSP device 130 may be configured to generate and provide a message to the user. For example, local FSP device 130 may contain a screen or other display. In certain embodiments, messages, such as those reflecting the results of authentication operations, may be displayed to the user via the screen or display of local FSP device 130. Similarly, following dispensing the cash, local FSP device 130 may display to the user a message indicating that the transaction is complete.

Figure 7:
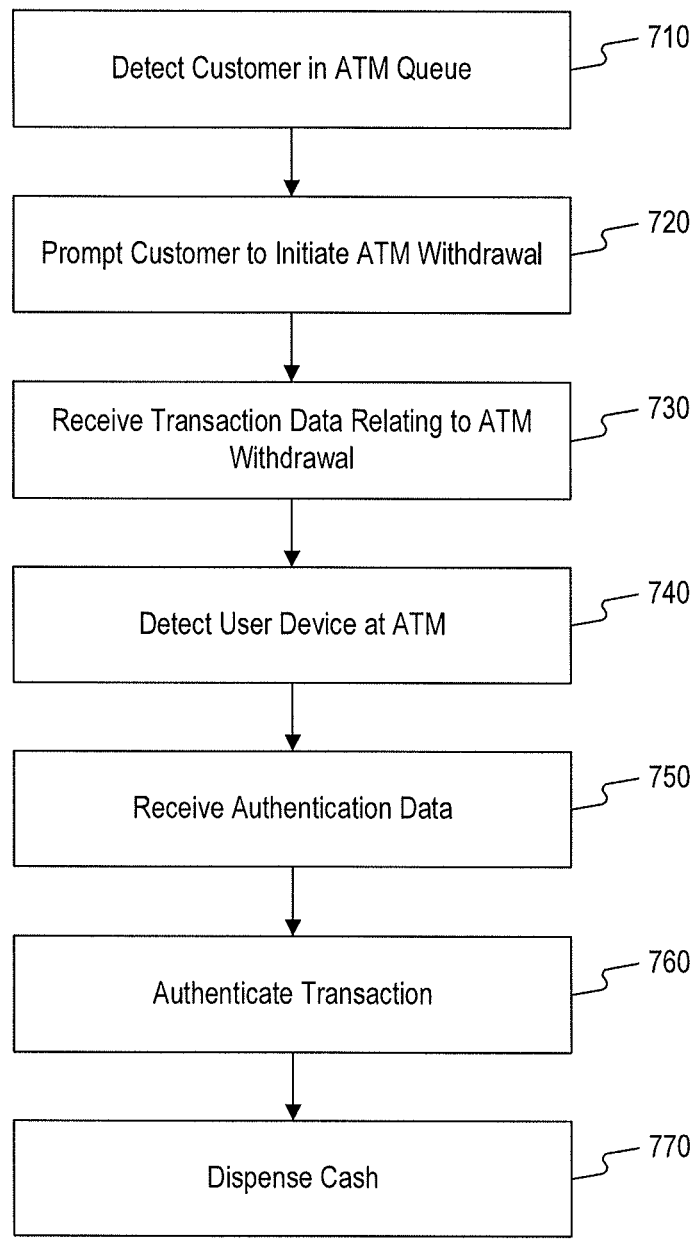
FIG. 7 is a flowchart of an exemplary process for an alternative embodiment for detecting and identifying a customer with a user device conducting an ATM withdrawal, consistent with disclosed embodiments.

FIG. 7 shows an alternative exemplary process 700 for detecting and identifying a customer conducting an ATM withdrawal, consistent with disclosed embodiments. Process 700 may be performed by processor 210 of, for example, FSP device 120 and/or local FSP device 130 (in this case, an ATM) executing instructions encoded on a computer-readable medium storage device. It is to be understood, however, that one or more steps of process 700 may be implemented by other components of system 100 (shown or not shown), including user device 110.

At step 710, local FSP device 130 may detect a customer with user device 110 in a local FSP device 130 queue (e.g., an ATM queue). For example, there may be a walk-up line for the ATM, or the customer may be in line for a drive-up ATM. Local FSP device 130 may detect the customer with user device 110 as described in detail with reference to FIGS. 3 and 5. For example, local FSP device 130 may receive an identification signal from user device 110, as described with reference to FIG. 5. Further, local FSP device 130 may detect user device 110 within the necessary threshold proximity, as described, for example with reference to FIG. 3. Additionally, local FSP device 130 may detect that the customer with user device 110 is currently in a queue, rather than in position to use the ATM. Local FSP device 130 may determine that the customer (user) is currently in a queue by detecting that the customer is more than, for example, three feet, five feet, etc. away from local FSP device 130.

Alternatively, FSP device 120 may detect a customer with user device 110 in a local FSP device 130 queue (e.g., an ATM queue). For example, FSP device 120 may be configured to execute software that performs processes to determine whether a user (e.g., customer) with a user device 110 is within a predetermined distance or range of distance(s) of local FSP device 130. For example, FSP device 120 may be configured to receive a signal from local FSP device 130 indicating that it has detected a signal from user device 110. FSP device 120 may then determine the physical location of user device 110 with respect to local FSP device 130.

At step 720, user device 110 may prompt the user to initiate a financial transaction while in the ATM queue. FSP device 120 may generate and provide data to user device 110 that may cause user device 110 to display a prompt to the user. For example, user device 110 may be configured to execute software that generates a prompt to (or causes a prompt to be generated to) the user to initiate a financial transaction, as described in detail with reference to FIG. 4. For example, FSP device 120 may cause user device 110 to display a prompt to the user when it detects that the physical location of user device 110 with respect to local FSP device 130 is less than a threshold distance. Alternatively, local FSP device 130 may transmit a signal to user device 110 indicating that it is within range, which may then cause user device 110 to display a prompt to the user. The prompt may contain, for example, a selection of possible transactions a user may initiate on user device 110.

At step 730, FSP device 120 and/or local FSP device 130 may receive the transaction data as described with reference to FIG. 4. For example, a user device 110 may enter information requesting a monetary withdrawal of funds from a financial service account provided by a financial service provider (e.g., an entity associated with FSP device 120). User device 110 may be configured to generate an interface to request transaction data from the user regarding the withdrawal. User device 110 may receive the user input of transaction data and store the received transaction data for processing in accordance with one or more operations consistent with the disclosed embodiments.

At step 740, local FSP device 130 may then detect the customer with user device 110 at the ATM. Local FSP device 130 may detect the customer with a within a certain threshold distance, as described in detail with reference to FIG. 6. For example, in certain aspects, local FSP device 130 may determine whether a user (customer) with a user device 110 is within one foot, two feet, six inches, etc. of local FSP device 130. For instance, local FSP device 130 may detect the customer by detecting, through network 140 (Wi-Fi, BLE, NFC, etc.), user device 110. User device 110 may need to be detected at a certain threshold distance before local FSP device 130 will connect and communicate with user device 110. For example, user device 110 may need to be within 6 inches of local FSP device 130 before the devices connect to conduct the transaction. Additionally or alternatively, local FSP device 130, such as an ATM, may have a particular location that the user may hold his or her user device 110 next to in order to indicate that they are first in the queue.

Alternatively, FSP device 120 may detect a customer with user device 110 at the local FSP device 130 (e.g., ATM). For example, FSP device 120 may be configured to execute software that performs processes to determine whether a user (e.g., customer) with a user device 110 is within a predetermined distance or range of distance(s) of local FSP device 130. For example, FSP device 120 may be configured to receive a signal from local FSP device 130 indicating that it has detected a signal from user device 110. FSP device 120 may then determine the physical location of user device 110 with respect to local FSP device 130. For example, if the location of user device 110 is within, for example, six inches of the ATM, FSP device 120 may determine that user device 110 is at the ATM.

At step 750, local FSP device 130 and/or FSP device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, FSP device 120 may receive authentication data through user device 110. If, for example, local FSP device 130 receives the authentication data, the data may then be transmitted to FSP device 120 for authentication. Authentication data may include, for example, a user name and password, social security number, ATM pin, biometric data, or other data associated with user identification methods (e.g., Sure- Swipe^SM or the like). Biometric data may include, for example, a fingerprint scan, voice recognition, facial recognition, retina or iris scan, or palm vein scan.

At step 760, FSP device 120 and/or local FSP device 130 may authenticate and authorize the transaction, as described in detail with respect to FIGS. 3 and 4. In some embodiments, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal, via network 140, to local FSP device 130 that the transaction has been authenticated and authorized. Alternatively, local FSP device 130 may authenticate and authorize the transaction independent from FSP device 120. The amount and type of authentication data required for FSP device 120 to authenticate the transaction may be determined by the amount of the transaction. For example, a higher transaction amount may require additional or more secure authentication data. At step 770, local FSP device 130, e.g. an ATM, may dispense cash to the user consistent with the amount indicated in the transaction data, as described in detail with reference to FIG. 6.

Figure 8:
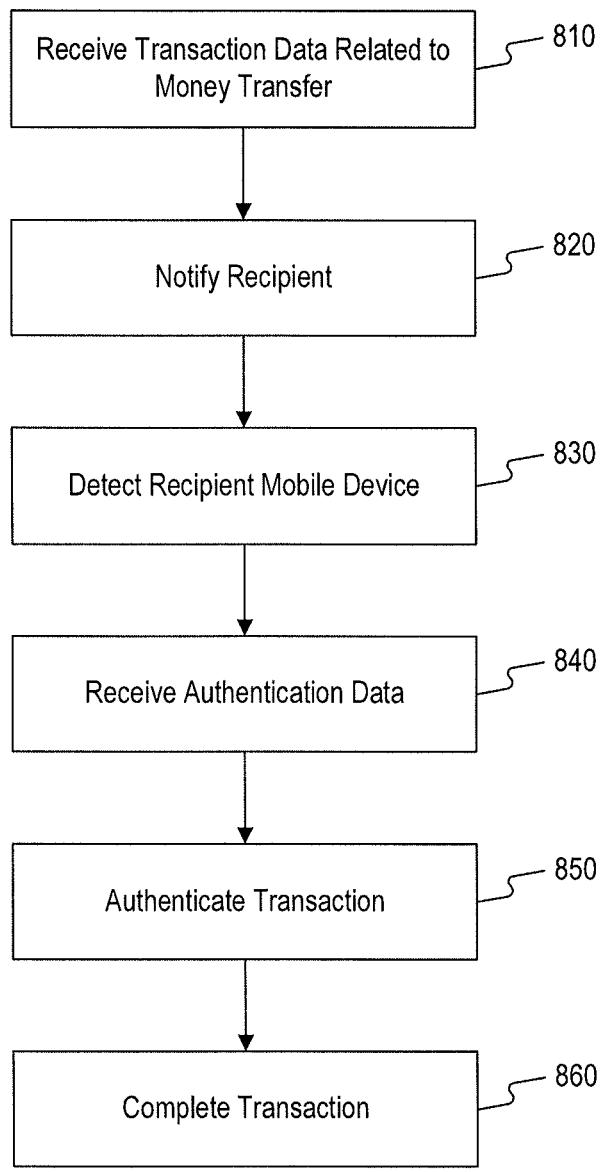
FIG. 8 is a flowchart of an exemplary process for detecting and identifying a recipient of a money transfer with a user device, consistent with disclosed embodiments.

FIG. 8 shows an exemplary process 800 process for detecting and identifying a recipient of a money transfer, consistent with disclosed embodiments. Process 800 may be performed by processor 210 of, for example, FSP device 120 and/or local FSP device 130 executing instructions encoded on a computer-readable medium storage device. It is to be understood, however, that one or more steps of process 800 may be implemented by other components of system 100 (shown or not shown), including user device 110.

At step 810, FSP device 120 may receive transaction data related to a money transfer. FSP device 120 may receive transaction data as discussed in detail with reference to FIG. 4. For example, a user device 110 may enter information requesting a monetary withdrawal of funds from a financial service account provided by a financial service provider (e.g., an entity associated with FSP device 120). User device 110 may be configured to generate an interface to request transaction data from the user regarding the withdrawal. User device 110 may receive the user input of transaction data and store the received transaction data for processing in accordance with one or more operations consistent with the disclosed embodiments. Transaction data may include, for example, the sender's account information, an amount, and recipient information. Recipient information may include, for example, an identifier such as a phone number, email address, social security number, or financial service account number.

At step 820, user device 110 may notify the recipient that they have a pending money transfer. User device 110 may notify the recipient, for example, by email, text message, or an alert in a mobile application. FSP device 120 may be configured to generate a notification message to a recipient based on the recipient information entered by the sender. For example, FSP device 120 may generate a message to a particular recipient and transmit the message to user device 110 of a recipient for display to the recipient in accordance with the disclosed embodiments. A recipient with a pending transfer may go to an ATM, branch location, or other local FSP device 130 in order to withdraw or collect their cash. Local FSP device 130 may detect the recipient with a user device 110 (step 830) the same way it would detect a regular customer with a user device 110, as described in detail with respect to FIGS. 3 and 5. Alternatively, FSP device 120 may detect the recipient with a user device 110. For example, FSP device 120 may be configured to execute software that performs processes to determine whether the recipient with a user device 110 is within a predetermined distance or range of distance(s) of local FSP device 130. For example, FSP device 120 may be configured to receive a signal from local FSP device 130 indicating that it has detected a signal from user device 110. FSP device 120 may then determine the physical location of user device 110 with respect to local FSP device 130.

At step 840, local FSP device 130 and/or FSP device 120 may receive authentication data for the recipient. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, FSP device 120 may receive authentication data through user device 110. If, for example, local FSP device 130 receives the authentication data, the data may then be transmitted to FSP device 120 for authentication. Authentication data may include, for example, a user name and password, social security number, ATM pin, or biometric data, or other data associated with user identification methods (e.g., SureSwipe^SM or the like). Biometric data may include, for example, a fingerprint scan, voice recognition, facial recognition, retina or iris scan, heartbeat or pulse pattern, or palm vein scan. FSP device 120 and/or local FSP device 130 may receive authentication data as described in detail with respect to FIGS. 3 and 4.

At step 850, FSP device 120 and/or local FSP device 130 may authenticate and authorize the transaction, as described in detail with respect to FIGS. 3 and 4. For example, in some embodiments, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal to local FSP device 130, via network 140, that the transaction has been authenticated and authorized. Alternatively, local FSP device 130 may authenticate and authorize the transaction independent from FSP device 120. The amount and type of authentication data required for FSP device 120 to authenticate the transaction may be determined by the amount of the transaction. For example, a higher transaction amount may require additional or more secure authentication data.

At step 860, FSP device 120 and/or local FSP device may complete the transaction, as described in detail with reference to FIGS. 3 and 4. In certain embodiments, FSP device 120 may be configured to transmit information to local FSP device 130 indicating that the transaction has been authenticated. Additionally, FSP device 120 may transmit information to local FSP device 130 indicating that local FSP device 130 should dispense cash in the transaction amount. For example, local FSP device 130 may, for example, dispense cash from an ATM, indicate that a deposit has been successfully processed, notify a teller that the user has been authorized for a cash withdrawal, complete the user's initiated transaction, and/or other operations. In certain aspects, FSP device 120 may be configured to generate and provide a message to user device 110 (or some other device) reflecting the results of the authentication operation (e.g., authentication denied and/or transaction denied; authentication accepted and/or transaction authorized).

The disclosed embodiments include methods and systems to provide customer recognition and identification techniques. In certain aspects, certain additional elements may be implemented to provide processes to authenticate a transaction conducted by a customer based on authentication levels. For example, FIGS. 9 through 13 relate to exemplary embodiments for authentication processes.

Figure 9:
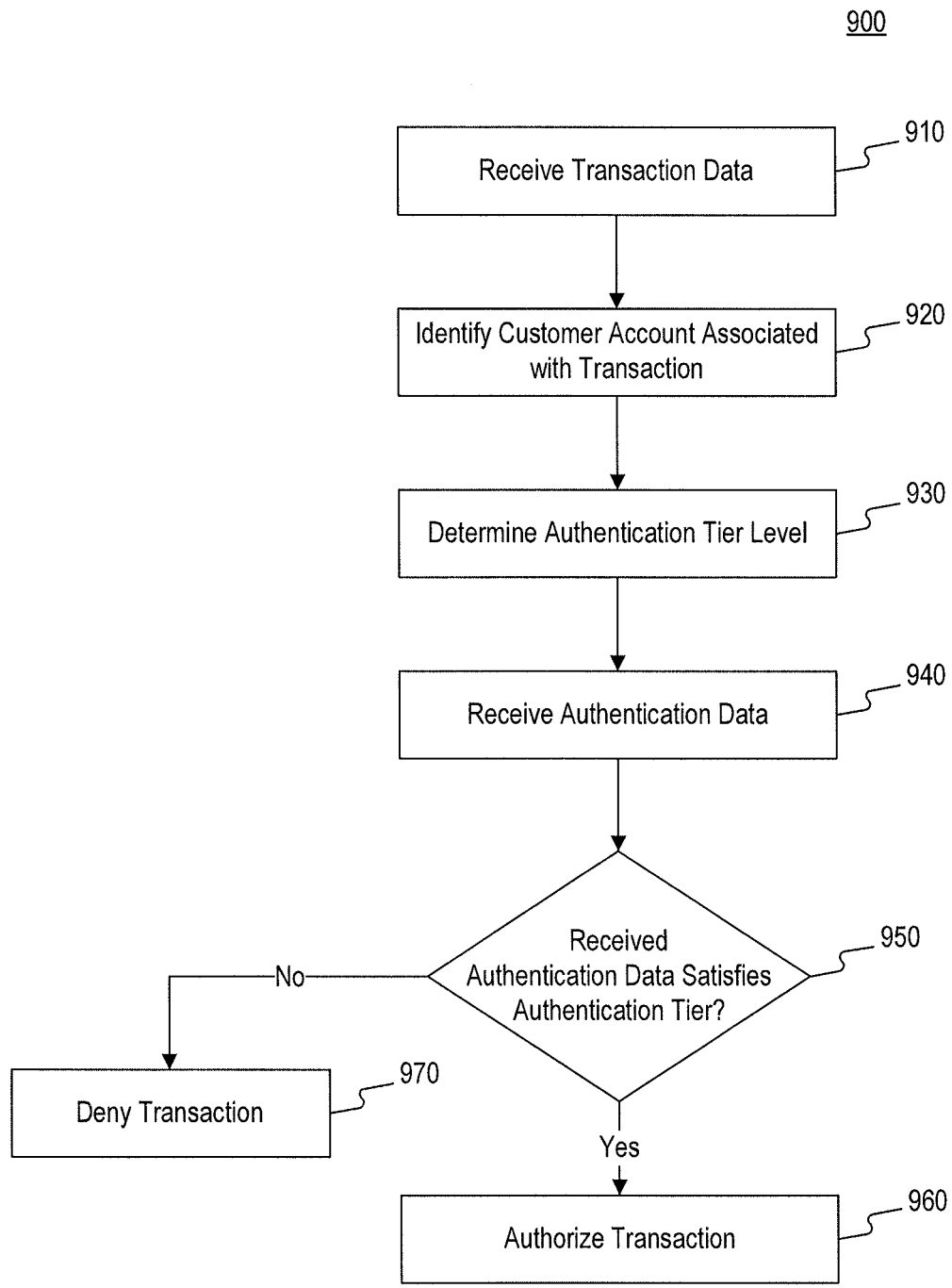
FIG. 9 is a flowchart of an exemplary process for authenticating a financial transaction, consistent with disclosed embodiments.

FIG. 9 shows an exemplary financial authorization process, consistent with disclosed embodiments. Process 900 may be performed by processor 210 of, for example, FSP device 120 executing instructions encoded on a computer-readable medium storage device. It is to be understood, however, that one or more steps of process 900 may be implemented by other components of system 100 (shown or not shown), including biometric database 150 and/or user device 110. At step 910, FSP device 120 may receive transaction data. In one aspect, FSP 120 may receive transaction data from user device 110. As an example, user device 110 may execute a mobile application associated with the financial service provider associated with FSP device 120. User device 100 may transmit transaction data via network 140 to FSP device 120. Transaction data may be entered and transmitted manually per transaction into user device 110 by a user, for example by typing it on a keyboard or other input device (not shown). Transaction data may also be entered and transmitted automatically, for example, by a mobile application on user device 110.

Transaction data may include a type of transaction and a customer identifier. A type of transaction may include, for example, an ATM withdrawal, a money transfer or wire, a change order, a debit card PIN reset, or a call center transaction. If the type of transaction is, for example, an ATM withdrawal, a money transfer or wire, or a change order, transaction data may further include an amount. In certain embodiments, transaction data may include other data relating to transactions that is known to those skilled in the art, such as transaction amount, timestamp information, entity identifier, account identifier(s), etc.

At step 920, FSP device 120 may identify a customer account associated with the transaction data. FSP device 120 may identify the customer account, for example, based upon the customer identifier that may be included in the received transaction data. The associated customer account may be any type of financial account, such as, for example, a debit account, checking account, savings account, or credit card account.

At step 930, FSP device 120 may determine an authentication tier level associated with the transaction. Each transaction may be associated with a tier level. Additionally, each user may have a different tier level associated with each transaction. The tier level may indicate how many data security points must be verified before FSP device 120 may authorize the requested transaction. Security data points may include, for example, a username and password, a GPS location, a phone number or device identifier, or other data associated with user identification methods (e.g., Sure-Swipe$^{SM}$ or the like). Security data points may additionally include biometric data, such as, for example, fingerprint, retina or iris scan, heartbeat or pulse pattern, facial recognition, voice recognition, or palm vein scan. Each data security point may correspond to a different tier. For example, biometric data may relate to a higher tier (more secure) than a username and password (less secure).

At step 940, FSP device 120 may receive authentication data. In some embodiments, FSP device 120 may prompt the user to enter authentication data through user device 110. The authentication data requested by FSP device 120 may correspond to the authentication tier level. For example, if the requested transaction required an authentication tier level two, the user may be prompted first to enter, for example, a user name and password to satisfy tier one. Then, the user may be prompted to enter, for example, biometric data such as a finger print scan, vocal recording, retina or iris scan, heartbeat or pulse pattern, facial scan or palm scan.

The user may provide authentication data via user device 110, and FSP 120 may receive the authentication data (step 940). The form of authentication data provided by the user may be dependent on the type of user device 110 the user is operating. For example, certain user devices may have a fingerprint scanner, but not a retina scanner. FSP device 120 may detect the capabilities of user device 110 when prompting the user to enter authentication data. Alternatively, FSP device 120 may prompt the user with a plurality of choices of authentication data the user may choose to enter, and the user may then select the option that corresponds with the capabilities of his or her particular user device 110.

At step 950, FSP device 120 may determine if the received authentication data satisfies the determined authentication tier. For example, if the authentication tier level for a particular transaction is 2, a user may first be prompted for a username and password; however, this data will not satisfy the required authentication tier. FSP device 120 may be configured to execute software that generates a prompt to (or causes a prompt to be generated to) the user for additional authentication data. In certain aspects, the disclosed embodiments may iteratively prompt the user for additional authentication data until the required authentication tier is satisfied or a threshold is met to deny the transaction. For example, once the received authentication data is satisfied (step 950—yes), FSP device 120 may authorize the requested transaction (step 960). If however, the received transaction does not satisfy the required authentication tier, for example, because the biometric data does not match, the username and password are incorrect, the user is attempting to access his account through an unknown mobile device, etc. (step 950—no), FSP device 120 may deny the transaction (step 970). In certain aspects, FSP device 120 may be configured to generate and provide a message to user device 110 (or some other device) reflecting the results of the authentication operation (e.g., authentication denied and/or transaction denied; authentication accepted and/or transaction authorized).

Figure 10:
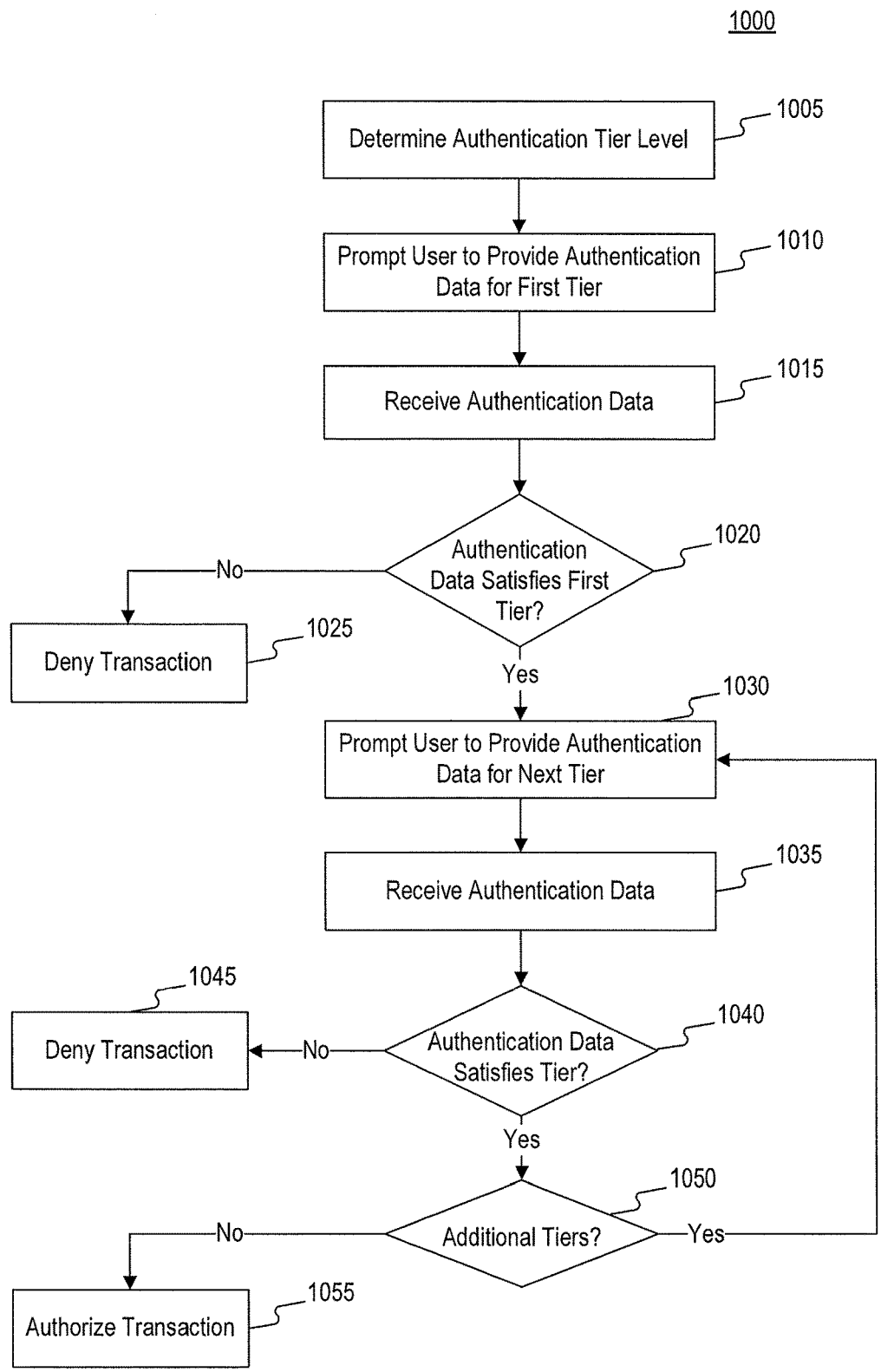
FIG. 10 is a flowchart of an exemplary process for authenticating a financial transaction in a multi-tiered authentication system, consistent with disclosed embodiments.

FIG. 10 shows an exemplary multi-tiered authentication process 1000, consistent with disclosed embodiments. Process 1000 may be performed by processor 210 of, for example, FSP device 120 executing instructions encoded on a computer-readable medium storage device. It is to be understood, however, that one or more steps of process 1000 may be implemented by other components of system 100 (shown or now shown), including biometric database 150 and/or user device 110.

At step 1005, as also discussed with reference to FIG. 9, FSP device 120 may determine an authentication tier level for a particular transaction. Each transaction may be associated with a tier level. Additionally, different users associated with different user device(s) 110 may have a different tier level associated with each transaction. In certain aspects, different users may be customer(s) or potential customers of the financial service provider associated with FSP device 120. The tier level may indicate how many data security points must be verified before FSP device 120 may authorize the requested transaction. Security data points may include, for example, a username and password, a GPS location, a phone number or device identifier, or other data associated with user identification (e.g., SureSwipe$^{SM}$ or the like). Security data points may additionally include biometric data, such as, for example, fingerprint, retina or iris scan, heartbeat or pulse pattern, facial recognition, voice recognition, or palm vein scan. Each data security point may correspond to a different tier. For example, biometric data may relate to a higher tier (more secure) than a username and password (less secure).

Assuming the authentication tier level determined in step 1005 is greater than one, FSP device 120 may prompt the user to provide authentication data sufficient to satisfy the first authentication tier (step 1010). FSP device 120 may then receive authentication data (step 1015). FSP device 120 may receive authentication data from, for example, user device 110. Authentication data may be entered manually by the user (e.g., username and password) or may be automatically transmitted to FSP device 120 by user device 110 (e.g., GPS data, phone or device identifier, etc.).

FSP device 120 may then determine if the authentication data received satisfies the first authentication tier (step 1020). FSP device 120 may determine if the authentication data satisfies the first tier by comparing the received authentication data with the stored customer information. Customer information may be stored, for example, in memory 230 or database 240. Customer information may additionally or alternatively be stored in biometric database 150. Biometric database 150 may be operated by the financial service provider. Alternatively, biometric database 150 may be operated and maintained by an independent third party or government entity. If the authentication data does not satisfy tier one (step 1020—no), for example, because the incorrect information was entered and there is not a match between the authentication data and the stored customer data, FSP device 120 may deny the transaction. If the authentication data satisfies tier one (step 1020—yes), FSP device 120 may indicate that the first tier of authentication has been satisfied and then move on to the next tier.

At step 1030, FSP device 120 again may prompt the user to provide authentication data. This time, the prompted authentication data may respond to the second tier. For example, second tier authentication data may indicate a higher level of security. For example, second tier authentication data may include GPS location, phone or device identification information, or user biometric data. If the requested second tier authentication data is related to user device 110 (e.g., GPS location or device identification information), the request for authentication data, as well as the responsive transmission of the requested data, may occur automatically and transparent to the user.

Similar to that discussed above in connection with a tier one operation, at step 1035, FSP device 120 may receive the authentication data, and then at step 1040, FSP device 120 may determine if the received authentication data satisfies the second tier. If the authentication data does not satisfy the tier (step 1040—no), for example, because incorrect information was received, FSP device 120 may deny the transaction (step 1045). Alternatively, if the received authentication data satisfies the tier (step 1040—yes), FSP device 120 may then determine if there are additional authentication tiers that need to be satisfied before the particular transaction can be authorized (step 1050). If there are no additional tiers (step 1050—no), then FSP device 120 may authorize the transaction. If, however, there are additional authentication tiers for the particular transaction (step 1050—yes), FSP device repeats the process beginning with step 1030 again, and continues to do so until all authorization tiers are satisfied. In certain aspects, FSP device 120 may be configured to generate and provide a message to user device 110 (or some other device) reflecting the results of the authentication operation(s) (e.g., authentication denied and/or transaction denied; authentication accepted and/or transaction authorized).

Figure 11:
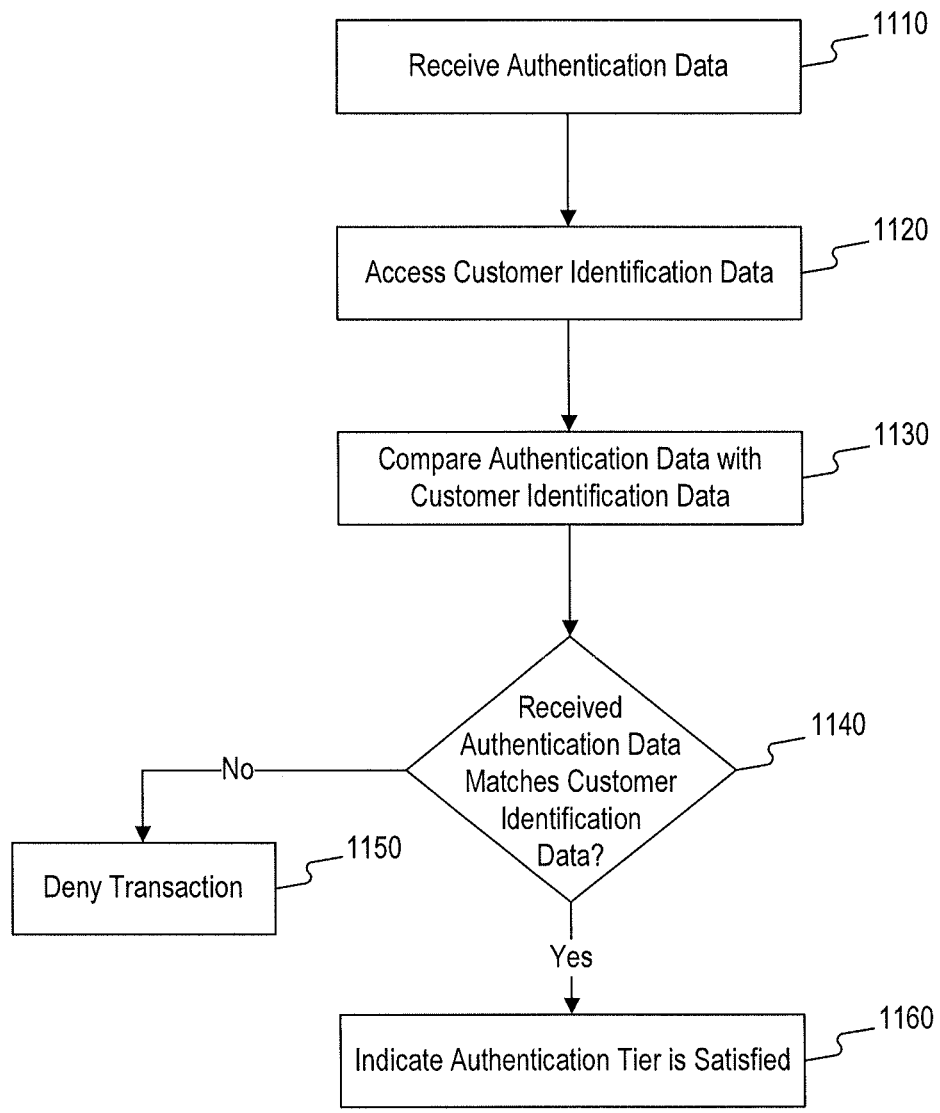
FIG. 11 is a flowchart of an exemplary process for authenticating a particular tier in a multi-tiered authentication system, consistent with disclosed embodiments.

FIG. 11 shows an exemplary authentication process 1100, consistent with disclosed embodiments. Process 1100 may be performed by processor 210 of, for example, FSP device 120 executing instructions encoded on a computer-readable medium storage device. It is to be understood, however, that one or more steps of process 1100 may be implemented by other components of system 100 (shown or not shown), including biometric database 150 and/or user device 110.

At step 1110, FSP device 120 may receive authentication data, as discussed previously with respect to FIGS. 9 and 10. At step 1120, FSP device 120 may access customer identification data. Customer identification data may be stored, for example, in memory 230 or database 240 of FSP device 120. Additionally or alternatively, customer identification data may be stored in biometric database 150. Customer identification data may include any stored data related to a customer that may correspond to the authentication data requested of a customer in order to validate the customer's identity for authentication purposes. For example, customer data may include a username and password, a known GPS location (e.g., the customer's home or work location), a device identifier (e.g., phone number, device serial number, IP address, etc.). Customer data may further include biometric data, such as, for example, fingerprints, retina and/or iris scans, heartbeat or pulse pattern, palm vein scan, facial image, or voice recording.

At step 1130, FSP device 120 may compare the received authentication data to determine if it matches the stored customer identification data. If the received authentication data does not match the customer identification data (step 1140—no), FSP device 120 may deny the transaction (step 1150). In certain aspects, FSP device 120 may be configured to generate and provide a message to user device 110 (or some other device) that the transaction was denied. If the received authentication data matches the corresponding customer data (step 1140—yes), FSP device 120 may indicate that the authentication tier is satisfied (step 1160). For example, FSP device 120 may be configured to execute software that generates information used to provide an indication reflecting the status of the authentication analysis, whether a transaction is authorized, etc. For example, in some embodiments, FSP device 120 may be configured to provide information to user device 110 that device 110 may use to generate and provide a message in an interface presented in a display device of user device 110. For instance, user device 110 may be configured, based on information provided by FSP device 120 to display a message on a display device that the authentication tier is satisfied or that a transaction has been authorized. Additionally or alternatively, FSP device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, FSP device may authorize the transaction.

Figure 12:
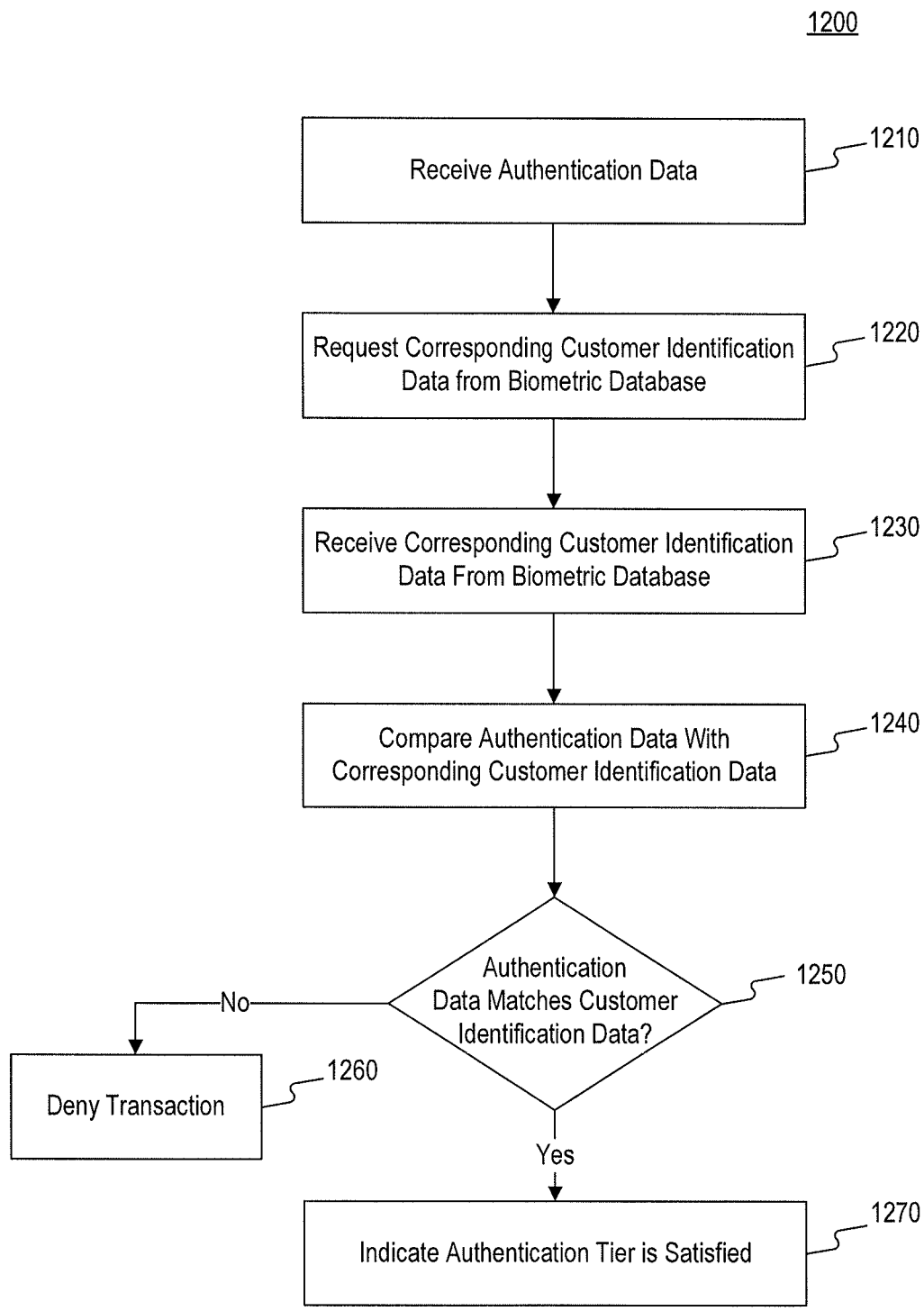
FIG. 12 is a flowchart of an exemplary process for authenticating a financial transaction when customer data is held by a third party, consistent with disclosed embodiments.

FIG. 12 shows an exemplary authentication process when the customer identification data is stored on a remote biometric database 150, consistent with disclosed embodiments. Process 1200 may be performed by processor 210 of, for example, FSP device 120 executing instructions encoded on a computer-readable medium storage device. It is to be understood, however, that one or more steps of process 1200 may be implemented by other components of system 100 (shown or not shown), including biometric database 150 and/or user device 110.

At step 1210, FSP device 120 may receive authentication data, as discussed in detail with respect to FIGS. 9 and 10. At step 1220, FSP device 120 may request corresponding customer identification data from biometric database 150. Requesting customer identification data may include, for example, requesting access to biometric database 150. Additionally or alternatively, requesting customer identification data may include, for example, requesting biometric database 150 to transmit the necessary information to FSP device 120, for example, via network 140. Additionally or alternatively, requesting customer identification data may include FSP device 120 transmitting the received authentication data to biometric database 150, and allowing biometric database 150 to conduct the validation and authentication. At step 1230, FSP device 120 may receive corresponding customer identification data from biometric database 150.

At step 1240, FSP device 120 may compare the received authentication data with the corresponding customer identification data received or accessed in step 1230. Additionally or alternatively, step 1240 may be performed by biometric database 150. Based on the comparison, FSP device 120 (or alternatively biometric database 150) may determine if the received authentication data matches the customer identification data (step 1250). If the received authentication data does not match the stored customer identification data (step 1250—no), FSP device 120 may deny the transaction (step 1260). In certain aspects, FSP device 120 may be configured to generate and provide a message to user device 110 (or some other device) that the transaction was denied. If the received authentication data matches the customer identification data (step 1250—yes), FSP device 120 may then then indicate that the authentication tier is satisfied (step 1270). For example, FSP device 120 may be configured to execute software that generates information used to provide an indication reflecting the status of the authentication analysis, whether a transaction is authorized, etc. For example, in some embodiments, FSP device 120 may be configured to provide information to user device 110 that user device 110 may use to generate and provide a message in an interface presented in a display device of user device 110. For instance, user device 110 may be configured, based on information provided by FSP device 120 to display a message to the user that the authentication tier is satisfied or notifying the user that the transaction has been authorized. Additionally or alternatively, FSP device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, FSP device 120 may authorize the transaction.

Figure 13:
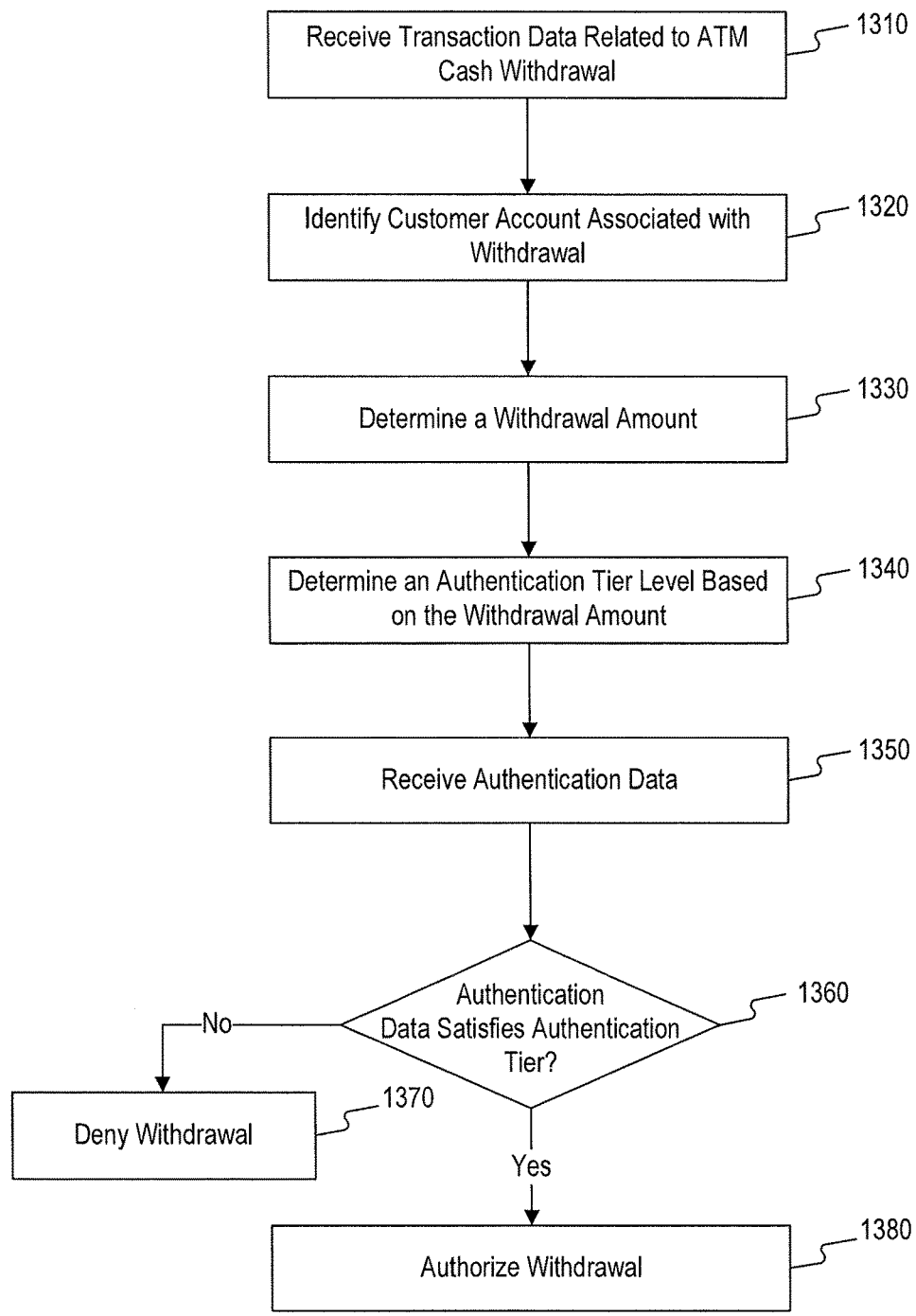
FIG. 13 is a flowchart of an exemplary multi-tiered authentication process relating to an ATM withdrawal transaction, consistent with disclosed embodiments.

FIG. 13 shows an exemplary authentication process 1300, consistent with disclosed embodiments, relating to an ATM withdrawal transaction. Process 1300 may be performed by processor 210 of, for example, FSP device 120 executing instructions encoded on a computer-readable medium storage device. It is to be understood, however, that one or more steps of process 1300 may be implemented by other components of system 100 (shown or not shown), including biometric database 150 and/or user device 110.

At step 1310, FSP device 120 may receive transaction data related to an ATM cash withdrawal. For example, a user may indicate through a mobile application installed on user device 110 that he or she wishes to make an ATM withdrawal. At step 1320, FSP device 120 may then identify a customer account associated with the transaction. FSP device 120 may identify the customer account by locating the matching customer account based on the transaction data. Additionally or alternatively, the mobile application on user device 110 the customer may be operating to initiate the transaction may require the user to log into a user account. If the user is logged into a user account on the mobile application, user device 110 may then automatically transmit the necessary information to FSP device 120 in order for FSP device 120 to identify the corresponding customer account.

FSP device 120 may then determine the withdrawal amount (step 1330). The withdrawal amount may be automatically transmitted to FSP device 120 by user device 110 when the user initiates the ATM withdrawal transaction. Additionally or alternatively, the withdrawal amount may be included in the transaction data received by FSP device 120 at step 1310. Based on the customer account and the withdrawal amount, FSP device 120 may then determine an authentication tier level for the transaction (step 1340). For example, the higher the withdrawal amount, the higher the authentication tier level may be in order to have the withdrawal transaction authorized.

At step 1350, FSP device 120 may receive authentication data, as discussed in detail with respect FIGS. 9 and 10. FSP device 120 (or alternatively biometric database 150) may then determine if the received authentication data matches the customer identification data, and therefore satisfies the authentication tier (step 1360). FSP device (or biometric database 150) may determine if the received authentication data matches the customer identification data by conducting a comparison as discussed in detail with respect to FIG. 6. If the received authentication data does not match the stored customer identification data, and therefore does not satisfy the authentication tier, (step 1360—no), FSP device 120 may deny the transaction (step 1370). In certain aspects, FSP device 120 may be configured to generate and provide a message to user device 110 (or some other device) that the transaction was denied. If the received authentication data matches the customer identification data (step 1360—yes), FSP device 120 may then then indicate that the authentication tier is satisfied. For example, FSP device 120 may be configured to execute software that generates information used to provide an indication reflecting the status of the authentication analysis, whether a transaction is authorized, etc. For example, in some embodiments, FSP device 120 may be configured to provide information to user device 110 that device 110 may use to generate and provide a message in an interface presented in a display device of user device 110. For instance, user device 110 may be configured, based on information provided by FSP device 120 to display a message to the user that the authentication tier is satisfied or notifying the user that the transaction has been authorized. Additionally or alternatively, FSP device 120 may internally indicate that the tier is satisfied, transparent to the user, by either prompting the user for authentication data relating to the next authentication tier, or if the final tier is satisfied, by authorizing the transaction. If the satisfied authentication tier corresponds to the determined authentication tier level required for the transaction, FSP device 120 may authorize the transaction and allow the withdrawal (step 1380).

Figure 14:
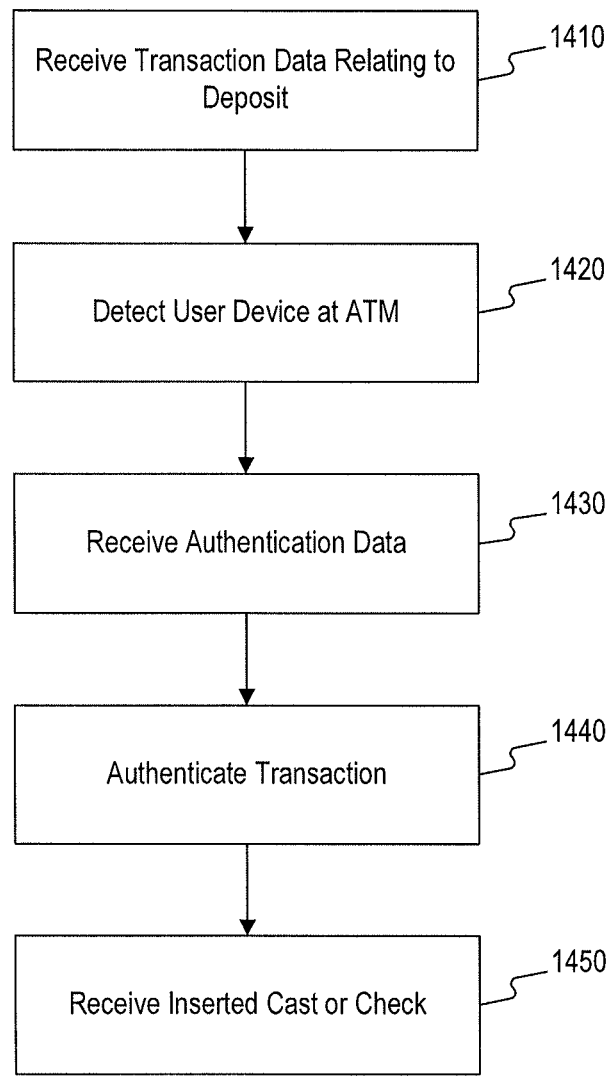
FIG. 14 is a flowchart of an exemplary process for making a deposit, consistent with the disclosed embodiments.

FIG. 14 shows an exemplary process for depositing funds, consistent with disclosed embodiments. Process 1400 may be performed by processor 210 of, for example, FSP device 120 and/or local FSP device 130 executing instructions encoded on a computer-readable medium storage device. It is to be understood, however, that one or more steps of process 1400 may be implemented by other components of system 100 (shown or not shown), including user device 110.

At step 1410, FSP device 120 may receive transaction data related to a deposit of funds. As previously discussed with reference to FIGS. 3 and 4, for example, user device 110 may execute a mobile application associated with the financial service provider associated with FSP device 120. The user device 110 may transmit transaction data via network 140 to FSP device 120. Transaction data may be entered manually into user device 110 by a user, for example by typing it on a keyboard or other input device (not shown), using voice recognition software, etc. Transaction data may also be entered and transmitted automatically, for example, by a mobile application on user device 110. Alternatively or additionally, local FSP device 130 may receive the transaction data from user device 110. For example, user device 110 may enter information requesting to deposit funds into a financial service account at an ATM provided by a financial service provider (e.g., an entity associated with FSP device 120). User device 110 may be configured to generate an interface to request transaction data from the user regarding the deposit. User device 110 may receive the user input of transaction data and store the received transaction data for processing in accordance with one or more operations consistent with the disclosed embodiments Local FSP device 130 may detect the customer with a user device 110 at an ATM (step 1420). In certain aspects, local FSP device 130 may be configured to execute software that performs processes to determine whether a user (e.g., customer) with a user device 110 is within a predetermined distance or range of distance(s) of local FSP device 130, in this case an ATM. For example, in certain aspects, local FSP device 130 may determine whether a user (e.g., customer) with a user device 110 is within one foot, two feet, six inches, etc. of local FSP device 130. For instance, local FSP device 130 may detect the customer by detecting user device 110, through network 140 (Wi-Fi, BLE, NFC, etc.), for example. User device 110 may need to be detected at a certain threshold distance before local FSP device 130 will connect and communicate with user device 110. For example, user device 110 may need to be within 6 inches of local FSP device 130 before the devices connect to conduct the transaction. Additionally or alternatively, local FSP device 130 may first detect the customer (step 1420) and then receive the transaction data (step 1410), as described with reference to FIG. 4. For example, user device 110 may be configured to execute software that generates a prompt to (or causes a prompt to be generated to) the user to initiate a financial transaction. Initiating a financial transaction, for example, may cause user device 110 to transmit transaction data to local FSP device 130.

In certain embodiments, FSP device 120 may determine whether user device 110 is at the local FSP device 130 (e.g., ATM) (step 1420). For example, FSP device 120 may be configured to execute software that performs processes to determine whether a user (e.g., customer) with a user device 110 is within a predetermined distance or range of distance(s) of local FSP device 130. In one aspect, FSP device 120 may be configured to execute software that relates the distance of user device 110 to local FSP device 130, to a distance of the customer associated with user device 110. For example, FSP device 120 may be configured to receive a signal from local FSP device 130 indicating that it has detected a signal from user device 110. FSP device 120 may then determine the physical location of user device 110 (and, for instance, the customer) with respect to local FSP device 130.

At step 1430, local FSP device 130 and/or FSP device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, FSP device 120 may receive authentication data through user device 110. If, for example, local FSP device 130 receives the authentication data, the data may then be transmitted to FSP device 120 for authentication. Authentication data may include, for example, a user name and password, social security number, ATM pin, biometric data, or other data associated with user identification methods (e.g., Sure-Swipe$^{SM}$ or the like). Biometric data may include, for example, a fingerprint scan, voice recognition, facial recognition, retina or iris scan, or palm vein scan.

At step 1440, FSP device 120 and/or local FSP device 130 may authenticate and authorize the transaction, as described in detail with respect to FIGS. 3 and 4. For example, in one embodiment, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal to local FSP device 130 that the transaction has been authenticated and authorized via network 140. Alternatively, local FSP device 130 may authenticate and authorize the transaction independent from FSP device 120. The amount and type of authentication data required for FSP device 120 to authenticate the transaction may be determined by the amount of the transaction. For example, a higher transaction amount may require additional or more secure authentication data.

In certain aspects, FSP device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local FSP device 130, or the ATM. For example, local FSP device 130 may contain a screen or other display. In certain embodiments, messages, such as those reflecting the results of authentication operations, may be displayed to the user via the screen or display of local FSP device 130.

At step 1450, local FSP device 130 (e.g., the ATM) may receive cash or a check consistent with the amount indicated in the transaction data. Local FSP device 130 may, for example, receive cash or a check in the amount of the deposit request, without the user ever having to physically manipulate components of local FSP device 130 (e.g., use a keypad on local FSP device 130, swipe a card, etc.). In certain embodiments, FSP device 120 may be configured to transmit information to local FSP device 130 indicating that the transaction has been authenticated.

In certain embodiments, inserting cash or a check into the ATM may complete the transaction. Prior to or following the insertion of cash or a check, the ATM may display to the user a message indicating that the transaction is processing. For example, local FSP device 130 may contain a screen or other display. In certain embodiments, messages, such as those reflecting the results of authentication operations, may be displayed to the user via the screen or display of local FSP device 130. Similarly, following insertion of the cash or check, the ATM may display to the user a message indicating that the transaction is complete.

Figure 15:
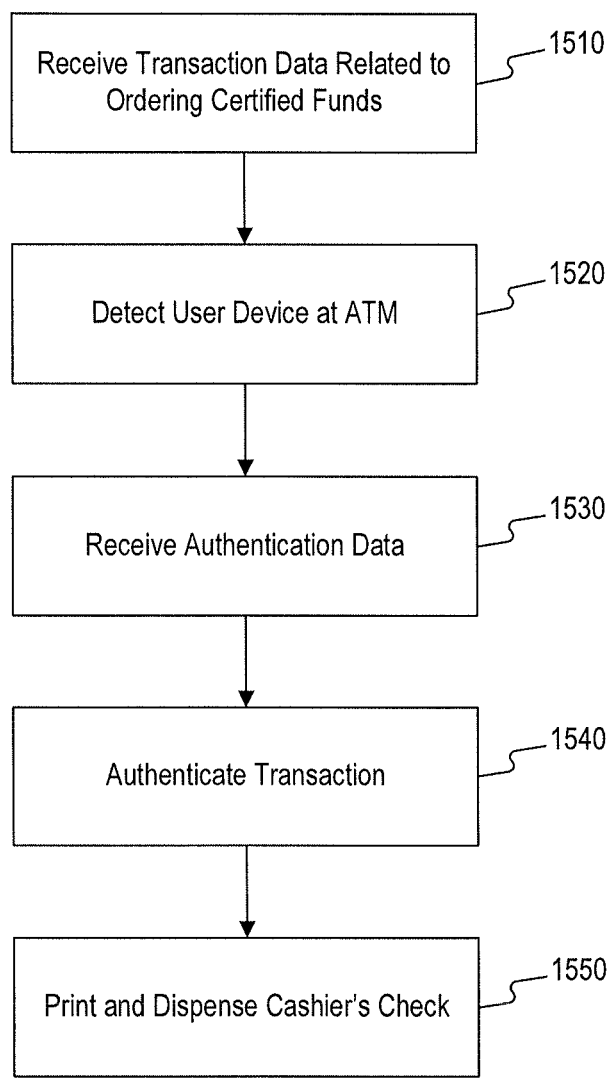
FIG. 15 is a flowchart of an exemplary process for placing an order for certified funds, consistent with the disclosed embodiments.

FIG. 15 shows an exemplary process for ordering certified funds or cashier's checks, consistent with disclosed embodiments. Process 1500 may be performed by processor 210 of, for example, FSP device 120 and/or local FSP device 130 executing instructions encoded on a computer-readable medium storage device. It is to be understood, however, that one or more steps of process 1500 may be implemented by other components of system 100 (shown or not shown), including user device 110.

At step 1510, FSP device 120 may receive transaction data related to a deposit of funds, as previously discussed with reference to FIGS. 3 and 4. As an example, user device 110 may execute a mobile application associated with the financial service provider associated with FSP device 120. User device 110 may transmit transaction data via network 140 to FSP device 120. Transaction data may be entered manually into user device 110 by a user, for example, by typing it on a keyboard or other input device (not shown), using voice recognition software, etc. Transaction data may also be entered and transmitted automatically, for example, by a mobile application on user device 110. Alternatively, local FSP device 130 may receive the transaction data from user device 110. For example, user device 110 may enter information requesting certified funds from a financial service provider. User device 110 may be configured to generate an interface to request transaction data from the user regarding the certified funds. User device 110 may receive the user input of transaction data, and store the received transaction data for processing in accordance with one or more operations consistent with the disclosed embodiments.

Local FSP device 130 may detect the customer with a user device 110 at an ATM or within a branch location (step 1520). In certain aspects, local FSP device 130 may be configured to execute software that performs processes to determine whether a user (e.g., customer) with a user device 110 is within a predetermined distance or range of distance(s) of local FSP device 130. For example, in certain aspects, local FSP device 130 may determine whether a user (e.g., customer) with a user device 110 is within one foot, two feet, six inches, etc. of local FSP device 130. For instance, local FSP device 130 may detect the customer by detecting user device 110, through network 140 (Wi-Fi, BLE, NFC, etc.), for example. User device 110 may be required to be detected at a certain threshold distance before local FSP device 130 will connect and communicate with user device 110. For example, user device 110 may need to be within 6 inches of local FSP device 130 before the devices connect to conduct the transaction. Additionally or alternatively, local FSP device 130 may first detect the customer (step 1420) and then receive the transaction data (step 1510), as described with reference to FIG. 4. For example, user device 110 may be configured to execute software that generates a prompt to (or causes a prompt to be generated to) the user to initiate a financial transaction. Initiating a financial transaction, for example, may cause user device 110 to transmit transaction data to local FSP device 130.

In certain embodiments, FSP device 120 may determine whether user device 110 is at the local FSP device 130 (e.g., ATM) (step 1520). For example, FSP device 120 may be configured to execute software that performs processes to determine whether a user (e.g., customer) with a user device 110 is within a predetermined distance or range of distance(s) of local FSP device 130. In one aspect, FSP device 120 may be configured to execute software that relates the distance of user device 110 to local FSP device 130, to a distance of the customer associated with user device 110. For example, FSP device 120 may be configured to receive a signal from local FSP device 130 indicating that it has detected a signal from user device 110. FSP device 120 may then determine the physical location of user device 110 (and, for instance, the customer) with respect to local FSP device 130.

At step 1530, local FSP device 130 and/or FSP device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, FSP device 120 may receive authentication data through user device 110. If, for example, local FSP device 130 receives the authentication data, the data may then be transmitted to FSP device 120 for authentication. Authentication data may include, for example, a user name and password, social security number, ATM pin, biometric data, or other data associated with user identification methods (e.g., Sure-Swipe$^{SM}$ or the like). Biometric data may include, for example, a fingerprint scan, voice recognition, facial recognition, retina or iris scan, or palm vein scan.

At step 1540, FSP device 120 and/or local FSP device 130 may authenticate and authorize the transaction, as described in detail with respect to FIGS. 3 and 4. For example, in one embodiment, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal to local FSP device 130 that the transaction has been authenticated and authorized via network 140. Alternatively, local FSP device 130 may authenticate and authorize the transaction independent from FSP device 120. The amount and type of authentication data required for FSP device 120 to authenticate the transaction may be determined by the amount of the transaction. For example, a higher transaction amount may require additional or more secure authentication data.

In certain aspects, FSP device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local FSP device 130, or the ATM. For example, local FSP device 130 may contain a screen or other display. In certain embodiments, messages, such as those reflecting the results of authentication operations may be displayed to the user via the screen or display of local FSP device 130.

At step 1550, local FSP device 130, the ATM, may print and dispense a cashier's check consistent with the information indicated by the user in the transaction data. Local FSP device 130 may, for example, print and dispense a cashier's check, without the user ever having to physically manipulate components of local FSP device 130 (e.g., use a keypad on local FSP device 130, swipe a card, etc.). In certain embodiments, FSP device 120 may be configured to transmit information to local FSP device 130 indicating that the transaction has been authenticated.

In certain embodiments, printing and dispensing the cashier's check by the ATM may complete the transaction. Prior to or during the printing and dispensing of the cashier's check, the ATM may display to the user a message indicating that the transaction is processing. For example, local FSP device 130 may contain a screen or other display. In certain embodiments, messages, such as those reflecting the results of authentication operations, may be displayed to the user via the screen or display of local FSP device 130. Similarly, following printing and dispensing the cashier's check, the ATM may display to the user a message indicating that the transaction is complete.

Figure 16:
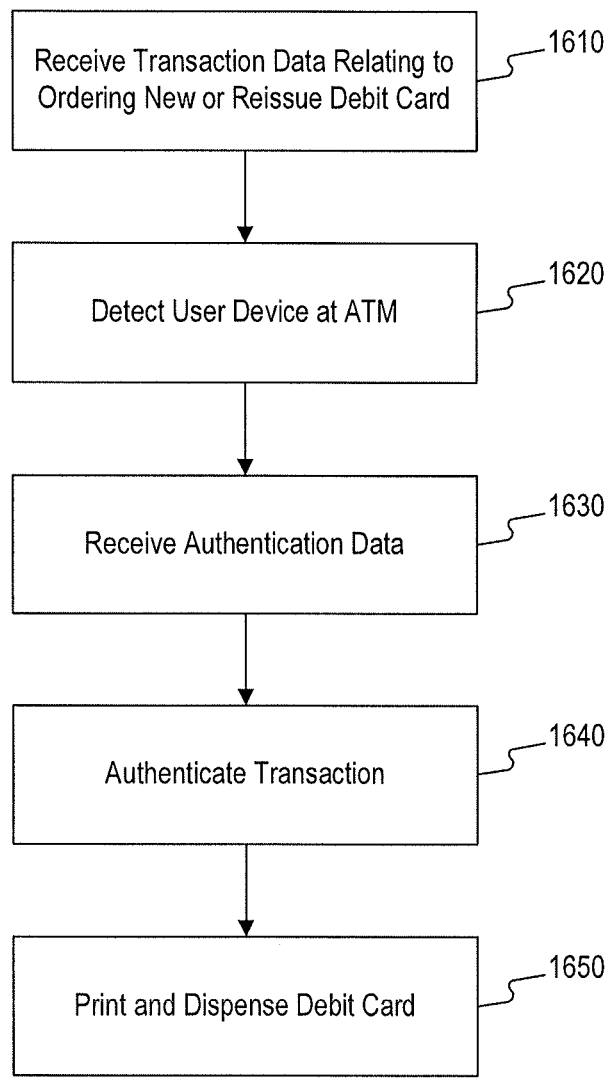
FIG. 16 is a flowchart of an exemplary process for ordering a new or reissue debit card, consistent with the disclosed embodiments.

FIG. 16 shows an exemplary process for ordering a new or reissue debit card, consistent with disclosed embodiments. Process 1600 may be performed by processor 210 of, for example, FSP device 120 and/or local FSP device 130 executing instructions encoded on a computer-readable medium storage device. It is to be understood, however, that one or more steps of process 1600 may be implemented by other components of system 100 (shown or not shown), including user device 110.

At step 1610, FSP device 120 may receive transaction data related to ordering a new or reissue debit card, as previously discussed with reference to FIGS. 3 and 4. As an example, user device 110 may execute a mobile application associated with the financial service provider associated with FSP device 120. User device 110 may transmit transaction data via network 140 to FSP device 120. Transaction data may be entered manually into user device 110 by a user, for example, by typing it on a keyboard or other input device (not shown), using voice recognition software, etc. Transaction data may also be entered and transmitted automatically, for example, by a mobile application on user device 110. Alternatively, local FSP device 130 may receive the transaction data from user device 110. For example, user device 110 may enter information requesting a new or reissued debit card related to a financial service account provided by a financial service provider (e.g., an entity associated with FSP device 120). User device 110 may be configured to generate an interface to request transaction data from the user regarding the request. User device 110 may receive the user input of transaction data and store the received transaction data for processing in accordance with one or more operations consistent with the disclosed embodiments. Transaction data for ordering a new or reissue debit card may include, for example, an account number and card design.

Local FSP device 130 may detect the customer with a user device 110 at an ATM (step 1620). In certain aspects, local FSP device 130 may be configured to execute software that performs processes to determine whether a user (e.g., customer) with a user device 110 is within a predetermined distance or range of distance(s) of local FSP device 130. For example, in certain aspects, local FSP device 130 may determine whether a user (e.g., customer) with a user device 110 is within one foot, two feet, six inches, etc. of local FSP device 130. For instance, local FSP device 130 may detect the customer by detecting user device 110, through network 140 (Wi-Fi, BLE, NFC, etc.), for example. User device 110 may need to be detected at a certain threshold distance before local FSP device 130 will connect and communicate with user device 110. For example, user device 110 may need to be within 6 inches of local FSP device 130 before the devices connect to conduct the transaction. Additionally or alternatively, local FSP device 130 may first detect the customer (step 1620) and then receive the transaction data (step 1610), as described with reference to FIG. 4. For example, user device 110 may be configured to execute software that generates a prompt to (or causes a prompt to be generated to) the user to initiate a financial transaction, such as the ordering of a new or reissue debit card. Initiating a financial transaction, for example, may cause user device 110 to transmit transaction data related to the order to local FSP device 130.

In certain embodiments, FSP device 120 may determine whether user device 110 is at the local FSP device 130 (e.g., ATM) (step 1620). For example, FSP device 120 may be configured to execute software that performs processes to determine whether a user (e.g., customer) with a user device 110 is within a predetermined distance or range of distance(s) of local FSP device 130. In one aspect, FSP device 120 may be configured to execute software that relates the distance of user device 110 to local FSP device 130, to a distance of the customer associated with user device 110. For example, FSP device 120 may be configured to receive a signal from local FSP device 130 indicating that it has detected a signal from user device 110. FSP device 120 may then determine the physical location of user device 110 (and, for instance, the customer) with respect to local FSP device 130.

At step 1630, local FSP device 130 and/or FSP device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, FSP device 120 may receive authentication data through user device 110. If, for example, local FSP device 130 receives the authentication data, the data may then be transmitted to FSP device 120 for authentication. Authentication data may include, for example, a user name and password, social security number, ATM pin, biometric data, or other data associated with user identification methods (e.g., SureSwipe[SM] or the like). Biometric data may include, for example, a fingerprint scan, voice recognition, facial recognition, retina or iris scan, or palm vein scan.

At step 1640, FSP device 120 and/or local FSP device 130 may authenticate and authorize the transaction, as described in detail with respect to FIGS. 3 and 4. For example, in one embodiment, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal to local FSP device 130 that the transaction has been authenticated and authorized via network 140. Alternatively, local FSP device 130 may authenticate and authorize the transaction independent from FSP device 120. The amount and type of authentication data required for FSP device 120 to authenticate the transaction may be determined by the amount of the transaction. For example, a higher transaction amount may require additional or more secure authentication data.

In certain aspects, FSP device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local FSP device 130, or the ATM. For example, local FSP device 130 may contain a screen or other display. In certain embodiments, messages, such as those reflecting the results of authentication operations may be displayed to the user via the screen or display of local FSP device 130.

At step 1650, local FSP device 130, the ATM, may print and dispense a debit card as ordered. Local FSP device 130 may, for example, print and dispense the requested debit card, without the user ever having to physically manipulate components of local FSP device 130 (e.g., use a keypad on local FSP device 130, swipe a card, etc.). In certain embodiments, FSP device 120 may be configured to transmit information to local FSP device 130 indicating that the transaction has been authenticated.

In certain embodiments, printing and dispensing the debit card may complete the transaction. Prior to or following the printing and dispensing of the debit card, the ATM may display to the user a message indicating that the transaction is processing. For example, local FSP device 130 may contain a screen or other display. In certain embodiments, messages, such as those reflecting the results of authentication operations may be displayed to the user via the screen or display of local FSP device 130. Similarly, following dispensing the debit card, the ATM may display to the user a message indicating that the transaction is complete.

Figure 17:
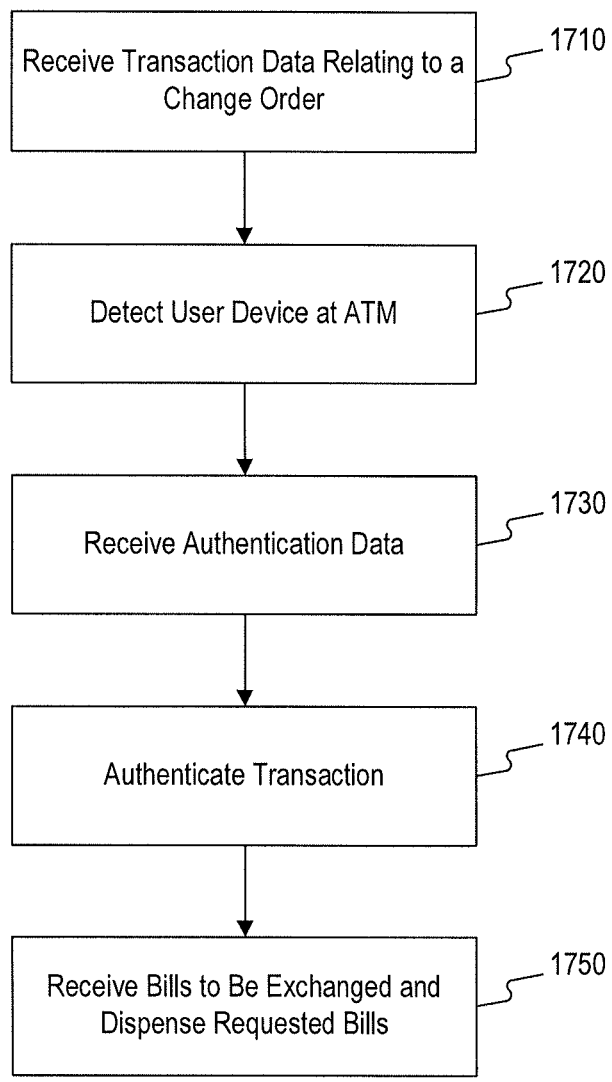
FIG. 17 is a flowchart of an exemplary process for submitting a change order, consistent with the disclosed embodiments.

FIG. 17 shows an exemplary process for submitting a change order, consistent with disclosed embodiments. A change order may be submitted by the owner of a small business who may submit large bills in exchange for small bills, for example, in order to be able to make change for customers throughout the day. Additionally or alternatively, a change order may be submitted to exchange a quantity of small bills for larger bills. Process 1700 may be performed by processor 210 of, for example, FSP device 120 and/or local FSP device 130 executing instructions encoded on a computer-readable medium storage device. It is to be understood, however, that one or more steps of process 1700 may be implemented by other components of system 100 (shown or not shown), including user device 110.

At step 1710, FSP device 120 may receive transaction data related to a change order, as previously discussed with reference to FIGS. 3 and 4. As an example, user device 110 may execute a mobile application associated with the financial service provider associated with FSP device 120. User device 110 may transmit transaction data via network 140 to FSP device 120. Transaction data may be entered manually into user device 110 by a user, for example, by typing it on a keyboard or other input device (not shown), using voice recognition software, etc. Transaction data may also be entered and transmitted automatically, for example, by a mobile application on user device 110. Alternatively, local FSP device 130 may receive the transaction data from user device 110. For example, user device 110 may enter information requesting a change order related to a financial service account provided by a financial service provider (e.g., an entity associated with FSP device 120). User device 110 may be configured to generate an interface to request transaction data from the user regarding the request. User device 110 may receive the user input of transaction data and store the received transaction data for processing in accordance with one or more operations consistent with the disclosed embodiments. Transaction data for ordering a change order may include, for example, the denomination of bills they would like to exchange, the denomination of bills they would like to receive, and a location where they would like to make the exchange if the customer is not already at a branch or ATM location.

Local FSP device 130 may detect the customer with a user device 110 at an ATM (step 1720). In certain aspects, local FSP device 130 may be configured to execute software that performs processes to determine whether a user (e.g., customer) with a user device 110 is within a predetermined distance or range of distance(s) of local FSP device 130. For example, in certain aspects, local FSP device 130 may determine whether a user (e.g., customer) with a user device 110 is within one foot, two feet, six inches, etc. of local FSP device 130. For instance, local FSP device 130 may detect the customer by detecting user device 110, through network 140 (Wi-Fi, BLE, NFC, etc.), for example. User device 110 may need to be detected at a certain threshold distance before local FSP device 130 will connect and communicate with user device 110. For example, user device 110 may need to be within 6 inches of local FSP device 130 before the devices connect to conduct the transaction. Additionally or alternatively, local FSP device 130 may first detect the customer (step 1720) and then receive the transaction data (step 1710). For example, user device 110 may be configured to execute software that generates a prompt to (or causes a prompt to be generated to) the user to initiate a financial transaction, such as the change order. Initiating a financial transaction, for example, may cause user device 110 to transmit transaction data related to the order to local FSP device 130.

In one aspect, FSP device 120 may be configured to execute software that relates the distance of user device 110 to local FSP device 130, to a distance of the customer associated with user device 110. For example, FSP device 120 may be configured to receive a signal from local FSP device 130 indicating that it has detected a signal from user device 110. FSP device 120 may then determine the physical location of user device 110 (and, for instance, the customer) with respect to local FSP device 130.

At step 1730, local FSP device 130 and/or FSP device 120 may receive authentication data, as described in detail with respect to FIGS. 3 and 4. For example, user device 110 may be configured to execute software that generates a prompt to (or causes a prompt to be generated to) the user to enter authentication data. The user may then enter the authentication data into user device 110. In certain aspects, the disclosed embodiments may iteratively prompt the user for additional authentication data until the necessary authentication data has been received. In other embodiments, FSP device 120 may receive authentication data through user device 110. If, for example, local FSP device 130 receives the authentication data, the data may then be transmitted to FSP device 120 for authentication. Authentication data may include, for example, a user name and password, social security number, ATM pin, biometric data, or other data associated with user identification methods (e.g., Sure-Swipe[SM] or the like). Biometric data may include, for example, a fingerprint scan, voice recognition, facial recognition, retina or iris scan, or palm vein scan.

At step 1740, FSP device 120 and/or local FSP device 130 may authenticate and authorize the transaction, as described in detail with respect to FIGS. 3 and 4. For example, in one embodiment, FSP device 120 may authenticate the transaction by comparing the received authentication data with stored customer data corresponding to the particular user. When the customer data matches the authentication data, the transaction may be authenticated, and FSP device 120 may then authorize the transaction. FSP device 120 may transmit a signal to local FSP device 130 that the transaction has been authenticated and authorized via network 140. Alternatively, local FSP device 130 may authenticate and authorize the transaction independent from FSP device 120. The amount and type of authentication data required for FSP device 120 to authenticate the transaction may be determined by the amount of the transaction. For example, a higher transaction amount may require additional or more secure authentication data.

In certain aspects, FSP device 120 may be configured to generate and provide a message to user device 110 (or some other device) reflecting the results of the authentication operation(s) (e.g., authentication denied and/or transaction denied; authentication accepted and/or transaction authorized). For example, the message to user device 110 may be a text message, email, message within a mobile application, or other message. In certain embodiments, the message may be displayed to the user via local FSP device 130, or the ATM. For example, local FSP device 130 may contain a screen or other display. In certain embodiments, messages, such as those reflecting the results of authentication operations may be displayed to the user via the screen or display of local FSP device 130.

At step 1750, local FSP device 130, the ATM, may receive the bills to be exchanged and dispense the new bills. Local FSP device 130 may, for example, allow for receipt of the bills for exchange and, once the quantity of bills received is confirmed, dispense the requested new denomination of bills, without the user ever having to physically manipulate components of local FSP device 130 (e.g., use a keypad on local FSP device 130, swipe a card, etc.). In certain embodiments, FSP device 120 may be configured to transmit information to local FSP device 130 indicating that the transaction has been authenticated.

In certain embodiments, dispensing the requested denominations of bills may complete the transaction. Prior to or following dispensing, the ATM may display to the user a message indicating that the transaction is processing. For example, local FSP device 130 may contain a screen or other display. In certain embodiments, messages, such as those reflecting the results of authentication operations may be displayed to the user via the screen or display of local FSP device 130. Similarly, following dispensing the requested bills, the ATM may display to the user a message indicating that the transaction is complete.

In some examples, some or all of the logic for the above-described techniques may be implemented as a computer program or application or as a plugin module or sub component of another application. The described techniques may be varied and are not limited to the examples or descriptions provided. In some examples, applications may be developed for download to mobile communications and computing devices, e.g., laptops, mobile computers, tablet computers, smart phones, etc., being made available for download by the user either directly from the device or through a website.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those of skill in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity detecting and identifying customers, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

What is claimed is:

1. A system for transacting at an automated teller machine (ATM), comprising:
   one or more memory devices storing instructions; and
   one or more processors configured to execute the instructions to:
   receive transaction data associated with a transaction request received from a mobile device associated with a customer, wherein the transaction data includes a customer identifier;
   identify a customer account based on the customer identifier;
   determine that the mobile device is physically located within a predetermined distance from the ATM, by detecting an identification signal transmitted from the mobile device to the ATM via a local network;
   responsive to the detected identification signal, transmit a signal to the mobile device indicating that the mobile device is within the predetermined distance from the ATM, for displaying a notification and prompt on the mobile device;

wherein a financial service provider system associated with the ATM detects capabilities associated with the mobile device;

prompt, via the signal, the mobile device based on the detected capabilities associated with the mobile device to provide authentication data associated with the customer;

receive, from the mobile device and in response to the displayed prompt, the authentication data associated with the customer, the authentication data being provided by the customer operating the mobile device and without requiring the customer to directly input data at the ATM and wherein a transaction amount above a predefined threshold requires receipt of a more secure type of authentication data or greater amount of authentication data;

determine, based on the transaction amount, whether the received authentication data authenticates the transaction;

based on the determination, iteratively prompt the mobile device to enter additional authentication data; wherein a number of iterations depends on the customer account and the transaction amount;

authorize the transaction when the authentication data authenticates the transaction by comparing the received authentication data with stored customer data corresponding to the customer; and based on the determination, provide an indication to the ATM to perform the transaction.

2. The system of claim 1, wherein the one or more processors are further configured to provide information to the mobile device that prompts the customer to initiate the transaction based on a determined physical location of the mobile device in relation to the ATM.

3. The system of claim 1, wherein the transaction request corresponds to request for certified funds for a transaction amount.

4. The system of claim 3, wherein the indication to the ATM causes the ATM to automatically dispense an order for certified funds for the transaction amount when the transaction is authorized.

5. The system of claim 1, wherein the one or more processors are further configured to provide information that causes the ATM to dispense a debit card when the transaction is authorized.

6. The system of claim 1, wherein the one or more processors are further configured to provide information that causes the ATM to receive a deposit of at least one of cash or one or more checks when the transaction is authorized.

7. The system of claim 1, wherein the ATM is located in a financial service provider branch location.

8. The system of claim 1, wherein the one or more processors are further configured to:

determine a physical location of the mobile device in relation to the ATM;

determine that the customer is in a queue based on the determined physical location of the mobile device in relation to ATM; and provide information to the mobile device to prompt the customer to initiate the transaction while the customer is in the queue.

9. The system of claim 8, wherein the one or more processors are further configured to determine that the customer is in the queue by determining that the mobile device associated with the customer is within a threshold distance of the ATM.

10. A computer-implemented method for transacting at an automated teller machine (ATM), comprising:

receiving, by one or more processors, transaction data associated with a transaction request received from a mobile device associated with a customer, wherein the transaction data includes a customer identifier;

identifying a customer account based on the customer identifier;

determining that the mobile device is physically located within a predetermined distance from the ATM, by detecting an identification signal transmitted from the mobile device to the ATM via a local network;

responsive to the detected identification signal, transmitting a signal to the mobile device indicating that the mobile device is within the predetermined distance from the ATM, for displaying a notification and prompt on the mobile device;

wherein a financial service provider system associated with the ATM detects capabilities associated with the mobile device;

prompt, via the signal, the mobile device based on the detected capabilities associated with the mobile device to provide authentication data associated with the customer;

receiving, from the mobile device and in response to the displayed prompt, the authentication data associated with the customer, the authentication data being provided by the customer operating the mobile device and without requiring the customer to directly input data at the ATM and wherein a transaction amount above a predefined threshold requires receipt of a more secure type of authentication data or greater amount of authentication data;

determining, by the one or more processors, based on the transaction amount, whether the received authentication data authenticates the transaction;

based on the determination, iteratively prompt the mobile device to enter additional authentication data; wherein a number of iterations depends on the customer account and the transaction amount;

authorizing the transaction when the authentication data authenticates the transaction by comparing the received authentication data with stored customer data corresponding to the customer; and based on the determination, providing an indication to the ATM to perform the transaction.

11. The method of claim 10, further including providing information to the mobile device that prompts the customer to initiate the transaction based on a determined physical location of the mobile device in relation to the ATM.

12. The method of claim 10, wherein the transaction request corresponds to request for certified funds for a transaction amount.

13. The method of claim 12, wherein the indication to the ATM causes the ATM to automatically dispense an order for certified funds for the transaction amount when the transaction is authorized.

14. The method of claim 10, further including providing information that causes the ATM to dispense a debit card when the transaction is authorized.

15. The method of claim 10, further including providing information that causes the ATM to receive a deposit of at least one of cash or one or more checks when the transaction is authorized.

16. The method of claim 10, wherein the ATM is in a financial service provider branch location.

17. The method of claim 10, further including:
  determining a physical location of the mobile device in relation to the ATM;
  determining that the customer is in a queue based on the determined physical location of the mobile device in relation to the ATM; and
  providing information to the mobile device to prompt the customer to initiate the transaction while the customer is in the queue.

18. The method of claim 17, further including determining that the customer is in the queue by determining that the mobile device is within a threshold distance of the ATM.

19. A non-transitory computer-readable medium storing instructions executable by a processor to perform operations for a transaction at an automated teller machine (ATM), the operations comprising:
  receiving transaction data associated with a transaction request received from a mobile device associated with a customer, wherein the transaction data includes a customer identifier;
  identifying a customer account based on the customer identifier;
  determining that the mobile device is physically located within a predetermined distance from the ATM, by detecting an identification signal transmitted from the mobile device to the ATM via a local network;
  responsive to the detected identification signal, transmitting a signal to the mobile device indicating that the mobile device is within the predetermined distance from the ATM, for displaying a notification and prompt on the mobile device;
  wherein a financial service provider system associated with the ATM detects capabilities associated with the mobile device;
  prompt, via the signal, the mobile device based on the detected capabilities associated with the mobile device to provide authentication data associated with the customer;
  receiving, from the mobile device and in response to the displayed prompt, the authentication data associated with the customer, the authentication data being provided by the customer operating the mobile device and without requiring the customer to directly input data at the ATM and wherein a transaction amount above a predefined threshold requires receipt of a more secure type of authentication data or greater amount of authentication data;
  determining, based on the transaction amount, whether the received authentication data authenticates the transaction;
  based on the determination, iteratively prompt the mobile device to enter additional authentication data;
  wherein a number of iterations depends on the customer account and the transaction amount;
  authorizing the transaction when the authentication data authenticates the transaction by comparing the received authentication data with stored customer data corresponding to the customer; and
  based on the determination, providing an indication to the ATM to perform the transaction.

20. The non-transitory computer-readable medium of claim 19, the instructions further executable by the processor to perform operations comprising:
  determining a physical location of the mobile device in relation to the ATM;
  determining that the customer is in a queue for the ATM based on the determined physical location of the mobile device in relation to the ATM;
  providing information that prompts the customer to initiate the transaction while the customer is in the queue.

* * * * *